(12) United States Patent (10) Patent No.: US 7,768,800 B2
Mazumder et al. (45) Date of Patent: Aug. 3, 2010

(54) MULTIPHASE CONVERTER APPARATUS AND METHOD

(75) Inventors: Sudip K. Mazumder, Chicago, IL (US); Rongjun Huang, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 33 days.

(21) Appl. No.: 12/334,273

(22) Filed: Dec. 12, 2008

(65) Prior Publication Data

US 2009/0196082 A1 Aug. 6, 2009

Related U.S. Application Data

(60) Provisional application No. 61/013,226, filed on Dec. 12, 2007, provisional application No. 61/037,751, filed on Mar. 19, 2008.

(51) Int. Cl.
*H02M 3/335* (2006.01)
(52) U.S. Cl. ...................................... 363/17
(58) Field of Classification Search ................. 363/17, 363/123, 34
See application file for complete search history.

(56) References Cited

U.S. PATENT DOCUMENTS

| 5,122,728 | A | 6/1992 | Ashley |
| 5,204,809 | A | 4/1993 | Andresen |
| 5,285,365 | A | 2/1994 | Yamato et al. |
| 5,598,326 | A | 1/1997 | Liu et al. |
| 5,856,712 | A | 1/1999 | Suzuki et al. |
| 6,005,788 | A | 12/1999 | Lipo et al. |
| 6,330,170 | B1 | 12/2001 | Wang et al. |
| 6,437,999 | B1 | 8/2002 | Wittenbreder |
| 7,113,414 | B2 * | 9/2006 | Matsushiro et al. ............ 363/37 |
| 7,372,709 | B2 | 5/2008 | Mazumder et al. |
| 2004/0125618 | A1 | 7/2004 | De Rooij et al. |

OTHER PUBLICATIONS

Blaabjerg, F., Jaeger, U., Munk-Nielsen, S., "Power Losses in PWM-VSI Inverter Using NPT or PT IGBT Devices." IEEE Trans. Power Electroncis, vol. 10 (3), pp. 358-367 (May 1995).
Cha, H. and Enjeti, P., "A New Soft Switching Direct Converter for Residential Fuel Cell Power System." IEEE IAS Annual Meeting, pp. 1172-1177 (2004).

(Continued)

*Primary Examiner*—Shawn Riley
(74) *Attorney, Agent, or Firm*—Greer, Burns & Crain Ltd.

(57) ABSTRACT

An ac/ac converter for accepting a pulsating dc input with encoded sinusoidal modulation and providing a multiphase modulated output. The converter comprises a bridge including a plurality of switches having switch legs for modulating the pulsating dc input at a carrier frequency over a plurality of phases. The bridge is coupled at one end to a pulsating dc source and coupled at another end to a modulated signal output. A controller is provided for the plurality of switches for causing, for each of the plurality of phases, under unity power factor, one of the switch legs to modulate the pulsating dc input at the carrier frequency while the other switch legs do not modulate the pulsating dc input at the carrier frequency.

19 Claims, 22 Drawing Sheets

OTHER PUBLICATIONS

Cho, J., Jeong, C., Lee, F., "Zero-Voltage and Zero-Current-Switching Full-Bridge PWM Converter Using Secondary Active Clamp." IEEE Trans. Power Electronics, vol. 13 (4), pp. 601-607 (Jul. 1998).

Espelage, P. et al., and Bose, B., "High-Frequency Link Power Conversion," IEEE Trans. Industry Applications, vol. 1A-13 (5), pp. 387-394 (Sep./Oct. 1977).

Friedrichs, P., et al., "SIC Power Devices with Low On-Resistance for Fast Switching Applications." The 12th International Symposium on Power Semiconductor Devices and ICs, pp. 213-216 (2000).

Fujimoto, H., Kuroki, K., Kagotani, T., Kidoguchi, H., "Photovoltaic Inverter with a Novel Cycloconverter for Interconnection to a Utility Line." IEEE IAS Annual Meeting, pp. 2461-2467 (1995).

Ghodke, D., Chatterjee, K., Fernandes, B., "Three-Phase Three Level, Soft Switched, Phase Shifted PRM DC-DC Converter for High Power Applications," IEEE Trans. Power Electronics, vol. 23 (3), pp. 1214-1227 (May 2008).

Houldsworth, J., Grant, D., "The Use of Harmonic Distortion to Increase the Output Voltage of a Three-Phase PWM Inverter." IEEE Trans. Industry Applications, IA-20 (5), pp. 1224-1228 (1984).

Huang, R. and Mazumder, S., "A Novel Soft-Switching Scheme for an Isolated Dc/Dc Converter with Pulsating Dc Output for a Three-Phase High-Frequency-Link PWM Converter," IEEE Conference, pp. 1-9 (2008).

Inoue, S. and Akagi, H., "A Bidirectional DC/DC Converter for an Engergy Storage with Galvanic Isolation." IEEE Trans. Power Electroncis, vol. 22 (6), pp. 2299-2306 (Nov. 2007).

Kawabata, T., Honjo, K., Sashida, N., Sanada, K., Koyama, M., "Hight Frequency Link DC/AC Converter with PWM Cycloconverter", IEEE IAS Annual Meeting, pp. 1119-1124 (1990).

Kolar, J., Ertl, H., Zach, F., "Influence of the Modulation Method on the Conduction and Switching Losses of a PWM Converter System", IEEE Trans. Industry Applications, pp. 1063-1075 (Nov./Dec. 1991).

Liu, C., Johnson, A., Lai, J., "A Novel Three-Phase High-Power Soft-Switched DC/DC Converter for Low-Voltage Fuel Cell Applications", IEEE Trans. Industry Applications, vol. 41 (6), pp. 1691-1697 (Nov./Dec. 2005).

Matsui, M., Nagai, M., Mochizuki, M., Nabae, A., "High-Frequency Link DC/AC Converter with Suppressed Voltage Clamp Circuits-Naturally Commutated Phase Angle Control with Self Turn-Off Devices", IEEE Trans. Industry Applications, vol. 32 (2), pp. 293-300 (1996).

Mazumder, S., and Acharya, K., "Multiple Lyapunov Function Based Reaching Condition Analyses of Switching Power Converters." IEEE Power Electronics Specialists Conference, pp. 2232-2239 (Jun. 2006).

Mazumder, S. and Huang, R., "A High-power High-Frequency and Scalable Multi-megawatt Fuel-cell Inverter for Power Quality and Distributed Generation." International Conference on Power Electronics, Drives and Energy Systems, pp. 1-5 (Dec. 12-15, 2006).

Mazumder, S., Pradhan, S., Hartvigsen, J., Rancruel, D., von Spakovsky, M., "Effects of Battery Buffering on the Post-Load-Transient Performance of a PSOFC," IEEE Trans. Energy Conversion, vol. 22 (2), pp. 457-466 (2007).

Mazumder, S., "A Novel Hybrid Modulation Scheme for an Isolated High-Frequency-Link Fuel Cell Inverter." Invited NSF Panel Paper, Proc. of IEEE Power Engineering Society Conference, Pittsburgh, (Jul. 2008).

Perruchoud, P. and Pinewski, P., "Power Losses for Space Vector Modulation Techniques." IEEE Power Electronics in Transportation, pp. 167-173 (1996).

Rocabert, J., Dumenjo, M., Bordonau, J., Jiminez, J., "A Regenerative Active Clamp Circuit for DC/AC Converters with High-Frequency Isolation in Photovoltaic Systems." IEEE PESC, pp. 2082-2088 (2004).

Sabate, J., Vlatkovic, V., Ridley, R., Lee, F., "High-Voltage, High-Power, ZVS, Full-Bridge PWM Converter Employing an Active Snubber." IEEE APEC, pp. 158-163 (1991).

Toh, L., Salam, Z., Ramli, M., "High-Frequency Transformer-Link Inverter with Regenerative Snubber," IEEE PEDS, pp. 642-647 (2006).

Trzynadlowski, A. and Legowski, S., "Minimum-Loss Vector PWM Strategy for Three-Phase Inverters", IEEE Trans. Power Electronics, vol. 9 (1), pp. 26-34 (1994).

Van der Broeck, H., "Analysis of the Harmonics in Voltage Fed Inverter Drives Caused by PWM Schemes with Discontinuous Switching Operation"Proc. EPE, pp. 3-261-3-266 (1991).

Wang, K., Lee, F., Dong, W., "A New Soft-Switched Quasi-Single-Stage (QSS) Bi-Directional Inverter/Charger", IEEE IAS Annual Meeting, pp. 2031-2038 (1999).

Watson, R. and Lee, F., "A Soft-Switched, Full-Bridge Boost Converter Employing an Active-Clamp Circuit." IEEE PESC, pp. 1948-1954 (1996).

9. Sample Calculations http://www.materialsworld.net/PASI/reading/Pages_369_to_451_from_PCHardbook6.pdf.

Andersen, G.K., Klumpner, C., Kjaer, S.B., and Blaabjerg, F., 2002, A new green power inverter for fuel cells, IEEE Power Electronics Specialists Conference, pp. 727-733.

Gopinath, R., Kim, S.S., and Enjeti, P. et al., 2002, Development of a low cost fuel cell inverter with DSP control, *IEEE Power Electronics Specialists Conference*, pp.

Wang, Gang; Pant, Pradeep, Mohammad, H., and Famouri, P., et al., 2003, High efficiency low cost inverter system for fuel cell application, *Fuel Cell Seminar*.

Mazumdar, J., Batarseh, I., and Kutkut, N. et al., 2002, High frequency low cost DC-AC inverter design with fuel cell source for home applications, *IEEE Industry Applications Conference*, pp. 789-794.

Tuckey, A.M. and Krase, J.N., 2002, A low-cost inverter for domestic fuel cell applications, *IEEE Power Electronics Specialists Conference*, pp. 339-346.

Krein, P.T. and Balog, R., 2002, Low cost inverter suitable for medium-power fuel cell sources, *IEEE Power Electronics Specialists Conference*, pp. 321-326.

Ertl, H., Kolar, J.W. and Zach, F.C., 2002, A novel multicell dc-ac converter for applications in renewable energy systems, *IEEE Transactions on Industrial Electronics*, pp. 1048-1057.

Wang, J. and Peng, F.Z., 2003, A new low cost inverter system for 5 kW fuel cell, *Fuel Cell Seminar*. (available at http://www.energychallenge.org/FuelCellSeminar.pdf).

Bohn, T.P. and Lorenz, R.D., 2003, A low-cost inverter for domestic fuel cell applications, *Fuel Cell Seminar*. (available at http://www.energychallenge.org/FuelCellSeminar.pdf).

Deng, S. and Mao, H., 2003, A new control scheme for high-frequency link inverter design, *IEEE Applied Power Electronics Conference and Exposition*, pp. 512-517.

Haynes, C. and Wepfer, W.J., Characterizing heat transfer within a commercial-grade tubular solid oxide fuel cell for enhanced thermal management, *International Journal of Hydrogen Energy*.

Acharya, K., Mazumder, S.K., and Burra, R.K. et al., 2003, System-interaction analyses of solid-oxide fuel cell (SOFC) power-conditioning system, *IEEE Industrial Application Society Conference.*, pp. 2026-2032.

Randall S. Germmen, Ph.d Analysis For The Effect of Inverter Ripple Current on Fuel Cell Operating Condition, NETL/DOE, Morgantown WV www.nferc.uci.edu/UFFC/PowerElectronics/PDFs/24_%20Gemmen.pdf.

Pyke, S.H., Burnett, A.J., and Leah, R.T. et al., Systems development for planar SOFC based power plant, ETSU F/01/00195/REP, DTI/Pub UNR 02/868, *Contractor: ALSTOM Research and Technology Centre*.

R.K. Burra, S.K. Mazumder, and R. Huang, A low-cost fuel-cell (FC) power electronic system (PES) for residential loads, *IEEE International Telecommunications energy conference*, 2004, pp. 468-478.

S.K. Mazumder and R. Burra, "Fuel Cell Power Conditioner for Stationary Power System: Towards Optimal Design from Reliability, Efficiency, and Cost Standpoint" Keynote Lecture on Fuel cell power electronics system, *ASME Third International Conference on Fuel Cell Science, Engineering and Technology*, Yipsilanti, Michigan, FUELCELL2005-74178, May 23-25, 2005.

Novaes, Y.R. and Barbi, I., 2003, Low Frequency Ripple Current Elimination in Fuel Cell Systems, *Fuel Cell Seminar* (available at http://www.energychallenge.org/FuelCellSeminar.pdf).

Dr. Jason Lai, A High-Efficiency Low-Cost DC-DC Converter for SOFC http://www.netl.doe.gov/publications/proceedings/03/seca%20core/Jason%Lai%20VT.pdf Saito, M. and Matsui, N., 2003, Modeling and control strategy for a single-phase PWM rectifier using a single-phase instantaneous active/reactive power theory, *IEEE International Telecommunications Energy Conference*, pp. 573-578.

Enjeti, P.N. and Kim, S., 1991, A new dc-side active filter for inverter power supplies compensates for unbalanced and nonlinear loads, *IEEE Industry Applications Society Conference*, pp. 1023-1031.

Peng, F.Z., 1998, Application issues of active power filters, *IEEE Industry Applications Magazine*, pp. 21-30.

Shimzu, T., Fujita, T., and Kimura G. et al., 1997, A unity power factor PWM rectifier with DC ripple compensation, *IEEE Transactions on Industrial Electronics*, pp. 447-455.

* cited by examiner

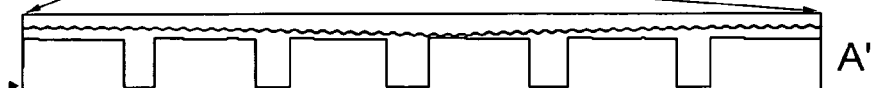 A'
 B'
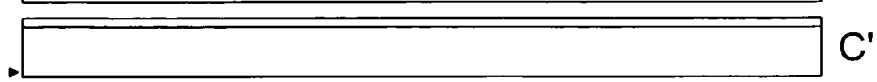 C'
 D'
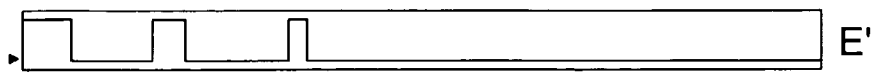 E'
 F'

MULTIPHASE CONVERTER APPARATUS AND METHOD

PRIORITY CLAIM AND REFERENCE TO RELATED APPLICATIONS

This application claims the benefit of U.S. Provisional Application Ser. Nos. 61/013,226, filed Dec. 12, 2007, and 61/037,751, filed Mar. 19, 2008, under 35 U.S.C. §119, which are incorporated in their entirety by reference herein.

STATEMENT OF GOVERNMENT INTEREST

This invention was made with Government assistance under National Science Foundation Award No. 0725887 and NSF CAREER Award No. 0239131. The Government has certain rights in this invention.

FIELD OF THE INVENTION

The invention relates generally to the fields of electrical devices and power systems. The invention relates more particularly to the fields of electrical modulation and conversion.

BACKGROUND OF THE INVENTION

Power conversion is often desired for providing particular power sources, for portability of power sources, for providing power in bulk, for transmission, or for other reasons. As one example, a major initiative has been taken recently towards the development of a modular solid-oxide-fuel-cell (SOFC) based inverter power system, which mainly feeds bulk power to a local utility load and, unlike active filters, does not need to support more than 30° of load power factor. However, various barriers exist to efficient and effective power conversion.

For example, isolation between a power source and a load is highly desirable and often a necessity (e.g., for safety reasons). To provide such isolation, magnetic transformers may be used. Such transformers, though, can be quite large (e.g., tens of tons), bringing difficulties for installation, repair, etc.

An alternative type of power conversion uses a high-frequency transformer, which can provide isolation while reducing the size of the transformer by a significant amount. High-frequency transformers have become more feasible due to recent technical advances. One example is a high-frequency inverter power system, which reduces the huge cost associated with the labor, weight, and footprint of a traditional utility transformer. The potential for high-frequency transformers has been improved by nanocrystalline core based transformer technology and high-voltage and high-frequency Si IGBTs and (more recently) SiC MOSFETs.

Towards that goal, two example feasible high-frequency, high voltage topologies have received attention in the art. One topology 10 is shown in FIG. 1, and is referred to herein as direct-power-conversion (DPC) topology. Another topology, referred to herein as voltage-source inverter (VSI) topology, may be obtained from the DPC topology 10 in FIG. 1 by simply placing a link capacitor between output converter and the rectifier. Both the DPC and VSI topologies can support varying load power factor angle up to, as a nonlimiting example, 60 degrees or more.

Referring to FIG. 1, both topologies have a front-end high-frequency converter 12 and a diode-rectifier bridge 14, and satisfy a requirement for isolation of a galvanic transformer 16 for a power source 18, such as but not limited to a fuel cell, battery, photovoltaic cell, etc. In other embodiments, the rectifier bridge may be switch-based to allow bidirectional power flow.

However, the two topologies differ at the output stage. An output stage of the VSI topology is a dc/ac inverter that is preceded by a decoupling link capacitor, while the last stage of the DPC topology is an ac/ac converter 20, which is not preceded by any decoupling link capacitor. Further, for the DPC topology, the primary-side converter 12 is operated with sine-wave modulation. For the VSI topology, on the other hand, the primary-side converter operates with square-wave modulation and the output (dc/ac) converter is sinusoidally modulated. In VSI, the filter capacitor provided after the rectifier feeds the output converter with a dc voltage rather than a pulsating dc.

In spite of advances in power conversion, several problems remain. One significant problem is switching loss of the converter. Another problem is the significant stresses (e.g., voltage, current stresses, electromagnetic emissions) on high-frequency, high-voltage devices.

SUMMARY OF THE INVENTION

According to example embodiments of the present invention, an ac/ac converter is provided for accepting a pulsating dc input with encoded sinusoidal modulation and providing a multiphase modulated output. In an example embodiment, the converter comprises a bridge including a plurality of switches having switch legs for modulating the pulsating dc input at a carrier frequency over a plurality of phases. The bridge is coupled at one end to a pulsating dc source and coupled at another end to a modulated signal output. A controller is provided for the plurality of switches for causing, for each of the plurality of phases, under unity power factor, one of the switch legs to modulate the pulsating dc input at the carrier frequency while the other switch legs do not modulate the pulsating dc input at the carrier frequency.

BRIEF DESCRIPTION OF THE DRAWINGS

FIG. 9A shows three-phase sine wave references and a carrier signal, FIG. 9B shows Q, a square wave with half frequency of the carrier, FIG. 9C shows UT, a gate signal for the upper switch of phase U, FIG. 9D shows VT, a gate signal for the upper switch of phase V, FIG. 9E shows $V_{uv}$, an output of phase U and V, and FIG. 9F shows $V_{rec}$, an output waveform of the rectifier;

FIG. 10A shows $V_{rec}$, an output PWM waveform of a rectifier with six-pulse envelop, FIG. 10B shows mod, a modulated signal and ramp, the carrier that is synchronous with $V_{rec}$, FIG. 10C shows UUT, a gate signal for the top switch of phase a, FIG. 10D shows VVT, a gate signal for the top switch of phase b, FIG. 10E shows WWT, a gate signal for the top switch of phase c, and FIG. 10F shows a PWM output of the line-line voltage $V_{ab}$ and its envelop;

FIG. 13A shows SPWM with 1/6 $3^{rd}$ rd harmonic injection, and FIG. 13B shows a discontinuous switching scheme "DIS-V0";

FIG. 15A shows switching waveforms at P2, and FIG. 15B shows waveforms at P3; FIG. 15A shows switching waveforms at P2, and FIG. 15B shows waveforms at P3.

DETAILED DESCRIPTION

Figure 1:
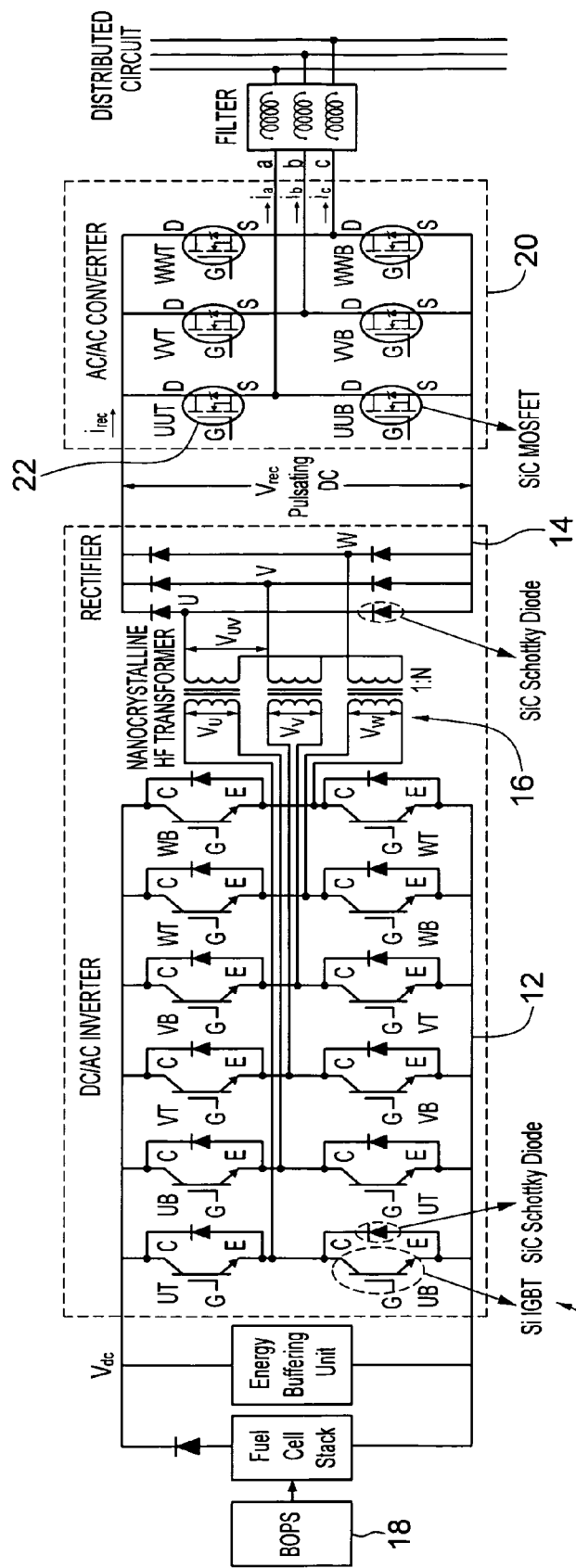
FIG. 1 is a schematic of example DPC topology.
Figure 2A:
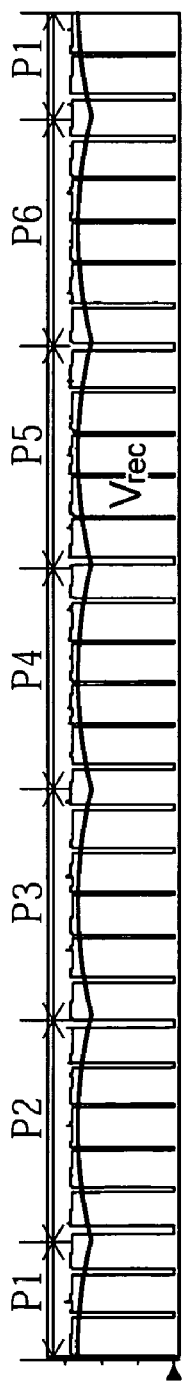
FIG. 2A shows a rectifier output $V_{rec}$ for inputting to an example hybrid-modulated ac/ac converter according to an embodiment of the present invention.
Figure 2B:
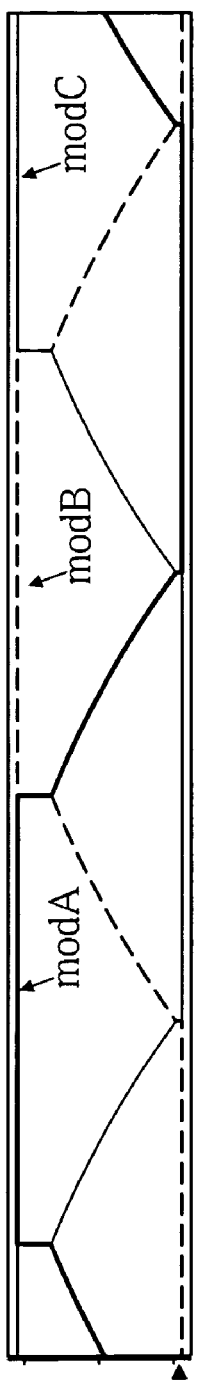
FIGS. 2B-2F show waveforms for an example hybrid-modulated ac/ac converter.
Figure 2C:
Figure 2D:
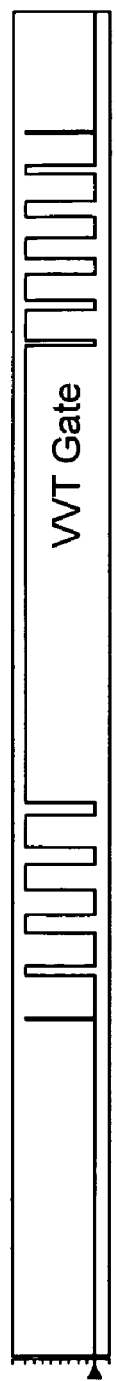
Figure 2E:
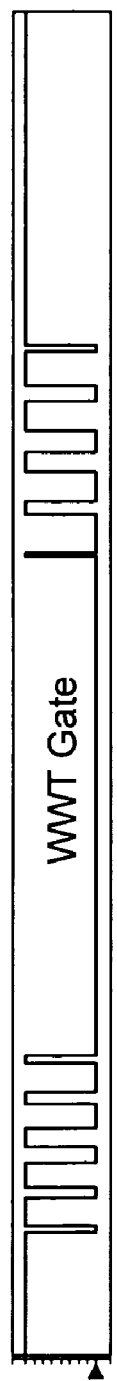
Figure 2F:
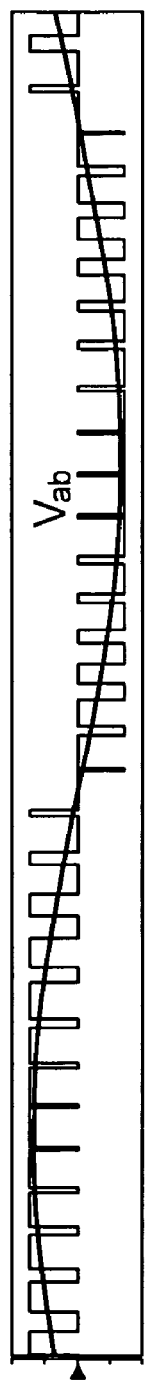
Figure 2G:
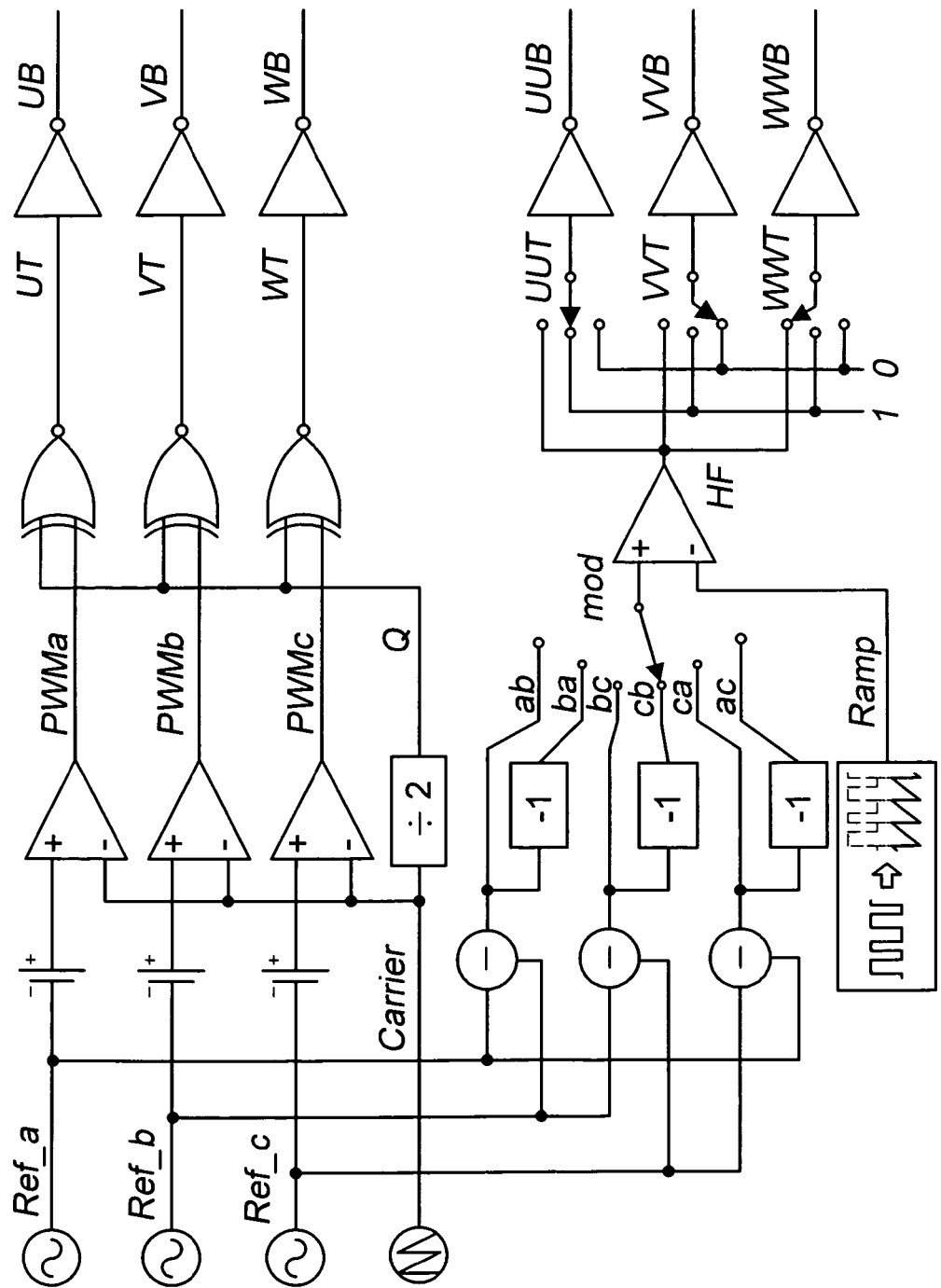
FIG. 2G shows an example modulation implementation schematic for DPC topology.

According to example embodiments of the present invention, a hybrid modulation method and devices using hybrid modulation methods are provided for ac/ac conversion. Generally, in an example hybrid modulation method, only one leg of a multi-phase switching scheme carries out forced switching (commutating) at any given time during a line cycle, while the other legs (e.g., two legs for a three-phase switching scheme) are not switching; that is, they do not change state. This is accomplished in example embodiments by inputting a modulated waveform to the example ac/ac converter. The ac/ac converter switches are triggered with a plurality of modulating references.

In a more particular example embodiment of the present invention, an ac/ac converter is provided for accepting a pulsating dc input with encoded sinusoidal modulation (pulsating dc with encoded sinusoidal modulation) and providing a multiphase modulated output. However, it is contemplated that other inputs are possible, including ac. Multiphase may include any number of phases greater than one, and the invention is not to be limited to a particular number of phases. In an example embodiment, the converter comprises a bridge including a plurality of switches having switch legs for modulating the pulsating dc input at a carrier frequency over a plurality of phases. The bridge is coupled at one end to a pulsating dc source and coupled at another end to a modulated signal output. The source can be, as nonlimiting examples, a standalone source, an output/input of a front end converter, and/or various other sources. The invention is not intended to be limited to receiving an input from a particular source.

A controller, e.g., hardware, software, firmware, analog, digital, analog/digital, etc., is provided for the plurality of switches for causing, for each of the plurality of phases, under unity power factor, one of the switch legs to modulate the pulsating dc input at the carrier frequency while the other switch legs do not modulate the pulsating dc input at the carrier frequency. Suitable drivers may be provided for driving the switches based on the controller. Nonlimiting example controllers are disclosed herein.

Hybrid modulation devices and methods have various applications. A nonlimiting example device according to an embodiment of the present invention provides a high-frequency and high-power direct-power-conversion (DPC) fuel-cell inverter topology, which can be unidirectional or bidirectional. The inventive modulation scheme reduces the overall loss of the output stage of the high-frequency-link inverter, as compared to a voltage-source-inverter (VSI) based topology, by reducing the switching requirements for the output stage while ensuring a total harmonic distortion that is comparable to the VSI topology whose output stage is forced switched at high frequency. In example devices, this is achieved using two general advantages: first, in the example DPC scheme, the output of the front-end isolated high-frequency dc/dc converter is not filtered, and hence the modulation information of the sinusoidally-modulated high-frequency inverter is retained; and second, for bulk power generation, only one of the three legs of the output ac/ac stage of the DPC topology is forced-switched while the other two legs are switched at significantly lower frequency because the input to the output ac/ac converter is a pulsating dc with embedded sinusoidal-modulation information.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

FIGS. 2A-2G show an example hybrid modulation scheme, applied the ac/ac converter of the DPC topology shown in FIG. 1 (though, again, the inventive hybrid modulation scheme is not intended to be limited to use in this topology). The input to the ac/ac converter 20 in this nonlimiting example is the rectifier 14 output (FIG. 2A) that represents the maximum line-to-line voltage, divided into six equal segments P1 to P6. The rectifier 14 is fed by the high-frequency primary-side converter 12 that is sinewave modulated with/without harmonic injection. The rectifier bridge can be diode or switch based. If switch based, bidirectional power flow can be provided. As shown by the example controller in FIG. 2G, using the rectifier output ($V_{rec}$) and three non-smooth modulating references (modA-modC) generated according to Table 1 are compared with the saw-tooth carrier.

TABLE 1

Modulation signals for ac/ac converter.

|      | P1 | P2 | P3 | P4 | P5 | P6 |
|------|----|----|----|----|----|----|
| modA | Ab | 1  | 1  | ac | 0  | 0  |
| modB | 0  | 0  | bc | 1  | 1  | Ba |
| modC | 0  | cb | 0  | 0  | Ca | 1  |

The obtained outputs are used to trigger the ac/ac converter switches 22 as shown in FIGS. 2B-2F. FIGS. 2B-2F show that, in a complete line cycle, each of the three legs forced commutates for $\frac{1}{3}^{rd}$ of the line cycle. Also, at any instant of time, only one leg switches at high frequency, while the other two legs do not change state. Further, each switch does not commutate just when its phase current is at the maximum value. All of these features reduce the converter switching loss.

The primary-side high-frequency converter 12 in FIG. 1 generates sinusoidally-modulated (can be with or without harmonic injection) bipolar outputs at the output of each phase in a given switching cycle with a phase shift of half the switching cycle. Subsequently, the maximum of the rectified phase-to-phase waveforms is fed to the ac/ac converter 20, which modulates it to generate the ac output. The overall expression for the output waveform of one phase (ab) is outlined in equation (1).

$$V_{ab} = \left[ \frac{V_{dc}}{2} + \frac{V_{dc}}{2}\left(\frac{M}{2}\right)\cos(\omega_o t) + \frac{2V_{dc}}{\pi}\sum_{m=1}^{\infty}\sum_{n=-\infty}^{\infty}\frac{1}{m}J_m\left(m\frac{\pi}{2}\frac{M}{2}\right)\sin\left((m+n)\frac{\pi}{2}\right)\cos(m\omega_c + n\omega_o)t \right] -$$

$$\left[ \frac{V_{dc}}{2} + \frac{V_{dc}}{2}\left(\frac{M}{2}\right)\cos\left(\omega_o\left(t-\frac{T}{2}\right)\right) + \frac{2V_{dc}}{\pi}\sum_{m=1}^{\infty}\sum_{n=-\infty}^{\infty}\frac{1}{m}J_m\left(m\frac{\pi}{2}\frac{M}{2}\right)\sin\left((m+n)\frac{\pi}{2}\right)\cos(m\omega_c + n\omega_o)\left(t-\frac{T}{2}\right) \right] -$$

$$\left[ \frac{V_{dc}}{2} + \frac{V_{dc}}{2}\left(\frac{M}{2}\right)\cos\left(\omega_o t - \frac{2\pi}{3}\right) + \frac{2V_{dc}}{\pi}\sum_{m=1}^{\infty}\sum_{n=-\infty}^{\infty}\frac{1}{m}J_m\left(m\frac{\pi}{2}\frac{M}{2}\right)\sin\left((m+n)\frac{\pi}{2}\right)\cos\left(m\omega_c t + n\left(\omega_o t - \frac{2\pi}{3}\right)\right) \right] + $$

$$\left[ \frac{V_{dc}}{2} + \frac{V_{dc}}{2}\left(\frac{M}{2}\right)\cos\left(\omega_o\left(t-\frac{T}{2}\right) - \frac{2\pi}{3}\right) + \frac{2V_{dc}}{\pi}\sum_{m=1}^{\infty}\sum_{n=-\infty}^{\infty}\frac{1}{m}J_m\left(m\frac{\pi}{2}\frac{M}{2}\right)\sin\left((m+n)\frac{\pi}{2}\right)\cos\left(m\omega_c\left(t-\frac{T}{2}\right) + n\left(\omega_o\left(t-\frac{T}{2}\right) - \frac{2\pi}{3}\right)\right) \right] \quad (1)$$

In equation (1), M is the modulation index, $\omega_o$ and $\omega_c$ are line and carrier frequencies, and J represents the Bessel function. For an example VSI topology, the primary difference for the Fourier series of the output waveform is that only the first and the third term will be necessary since the input to the final converter is a dc. Also, the M/2 terms are replaced by M.

Figure 3:
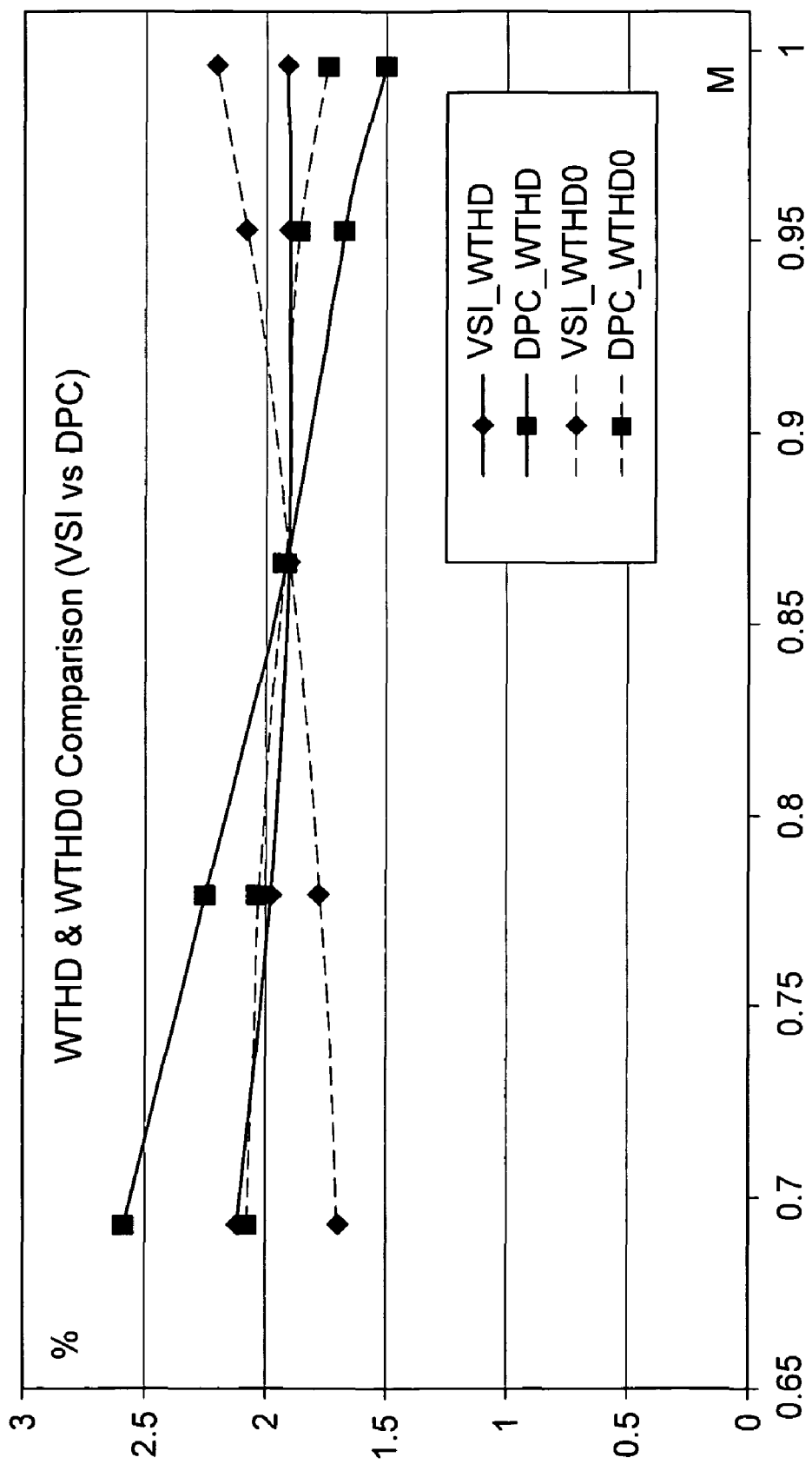
FIG. 3 shows a weighted total harmonic distortion (THD) and WTHD0 for DPC and VSI topologies operating with double-sided naturally sampling modulation with $\frac{1}{6}^{th}$ $3^{rd}$ harmonic injection.

Using Fourier analysis, one can obtain the comparative THD (as shown in FIG. 3) for the VSI and DPC (using hybrid modulation).

Figure 4B:
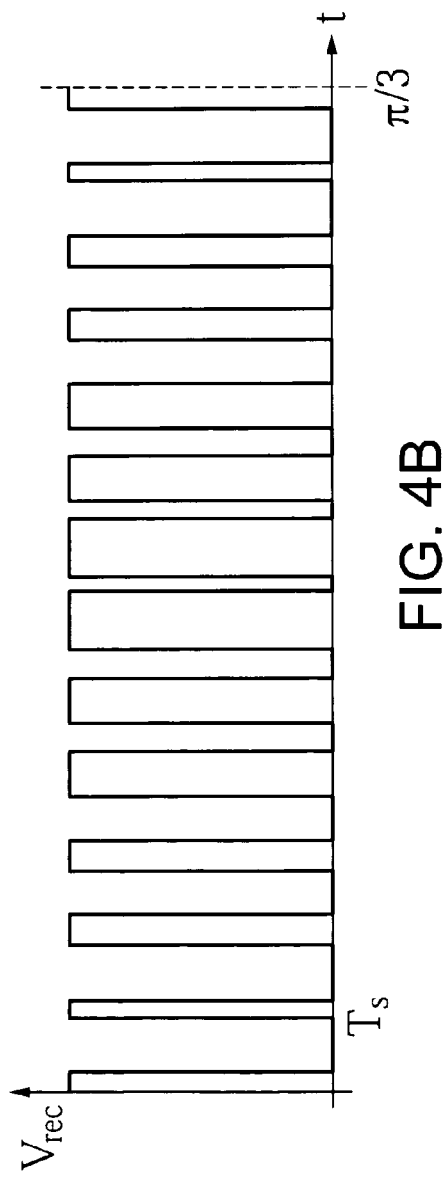
FIG. 4B shows a modulated input voltage waveform.
Figure 4A:
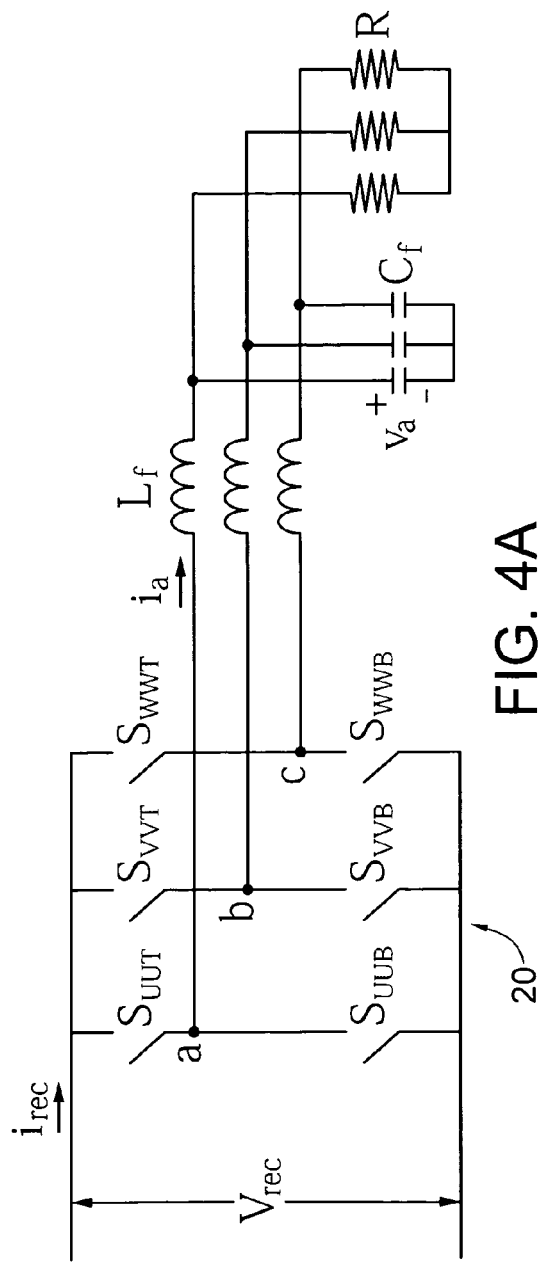
FIG. 4A is a schematic of an example ac/ac converter according to an embodiment of the present invention.

The PWL model of the ac/ac converter 20 (FIG. 4A) with hybrid modulation is expressed as:

$$\dot{x} = A_i x + B_i \quad (2)$$

where symbol i represents the switching states of equation (2) and $$x = \begin{pmatrix} i_{fa} \\ i_{fb} \\ i_{fc} \\ v_{fa} \\ v_{fb} \\ v_{fc} \end{pmatrix},$$

$$A_i = \begin{bmatrix} 0 & 0 & 0 & -1/L_f & 0 & 0 \\ 0 & 0 & 0 & 0 & -1/L_f & 0 \\ 0 & 0 & 0 & 0 & 0 & -1/L_f \\ 1/C_f & 0 & 0 & 1/R_L C_f & 0 & 0 \\ 0 & 1/C_f & 0 & 0 & 1/R_L C_f & 0 \\ 0 & 0 & 1/C_f & 0 & 0 & 1/R_L C_f \end{bmatrix},$$

$$\text{and } B_i = \begin{pmatrix} 1/3L_f(2UUT - VVT - WWT)V_{rec} \\ 1/3L_f(2VVT - UUT - WWT)V_{rec} \\ 1/3L_f(2WWT - UUT - VVT)V_{rec} \\ 0 \\ 0 \\ 0 \end{pmatrix}$$

The switching function (UUT) of one leg of the ac/ac converter is outlined in equation (3) below. The reaching criterion of equation (2) depends on the number of non-repetitive and non-redundant switching sequences generated by the non-complementary switching functions (one switching function for the ac/ac converter is given in equation (4) below). For the ac/ac converter described by equation (2), the reaching condition is satisfied, provided that there exist positive definite matrices $P_{ki}$, such that:

$$UUT = \begin{cases} \left[ \dfrac{1 + \text{sgn}\left(\dfrac{M}{2}\left(\begin{array}{c}\sin(\omega_o t) - \\ \sin(\omega_o t - 2\pi/3)\end{array}\right) - V_{ramp}\right)}{4} + \\ \dfrac{1 + \text{sgn}\left(\dfrac{M}{2}\left(\begin{array}{c}\sin\omega_o(t - T/2) - \\ \sin(\omega_o(t - T/2) - 2\pi/3)\end{array}\right) - V_{ramp}\right)}{4} \right] \\ 1 \\ 1 \\ -\left[ \dfrac{1 + \text{sgn}\left(\dfrac{M}{2}\left(\begin{array}{c}\sin(\omega_o t) - \\ \sin(\omega_o t - 4\pi/3)\end{array}\right) - V_{ramp}\right)}{4} - \\ \dfrac{1 + \text{sgn}\left(\dfrac{M}{2}\left(\begin{array}{c}\sin(\omega_o(t - T/2)) - \\ \sin(\omega_o(t - T/2) - 4\pi/3)\end{array}\right) - V_{ramp}\right)}{4} \right] \\ 0 \\ 0 \end{cases} \quad (3)$$

Figure 5A:
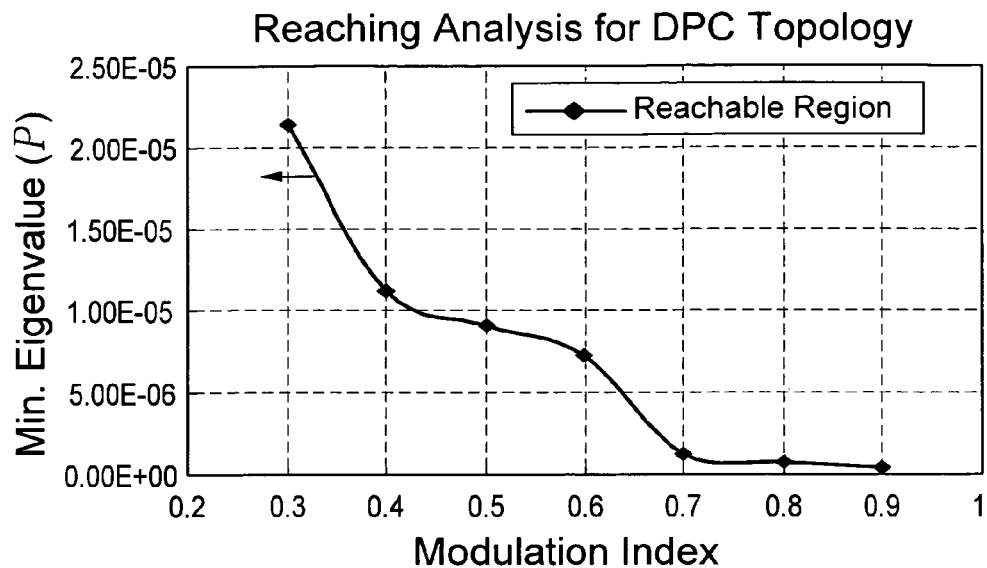
FIG. 5A shows a reaching analysis for an example DPC topology.
Figure 5B:
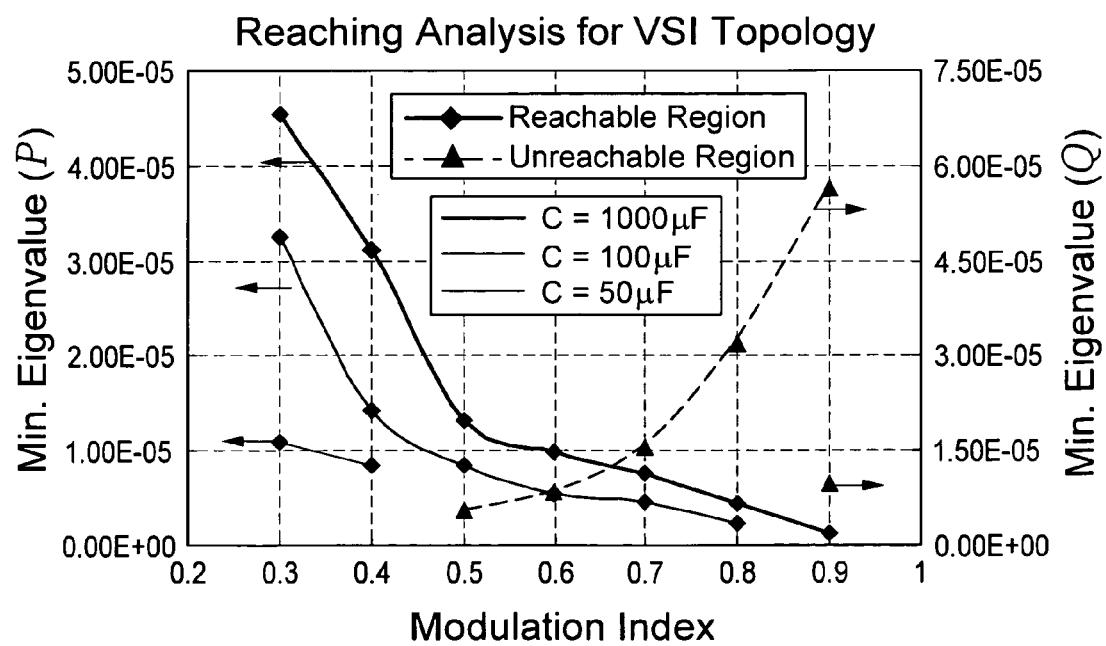
FIG. 5B shows a reaching analysis for an example VSI topology.

-continued $11\pi/6 < \theta \le \pi/6$
$\pi/6 < \theta \le \pi/2$
$\pi/2 < \theta \le 5\pi/6$
$5\pi/6 < \theta \le 7\pi/6$
$7\pi/6 < \theta \le 3\pi/2$
$3\pi/2 < \theta \le 11\pi/6$ $$\sum_{i=1}^{h} \alpha_{ki} \begin{bmatrix} A_i^T P_{ki} + P_{ki} A_i & P_{ki} \overline{B}_i \\ \overline{B}_i^T P_{ki} & 0 \end{bmatrix} < 0 \quad (4)$$

where $\overline{B}_i = -(B_i + A_i x^*)$ and $x^*$ is the state reference values. Reachability analysis shown in FIG. 5 based on composite Lyapunov method clearly illustrates the global stability of the DPC topology 10.

Figure 6A:
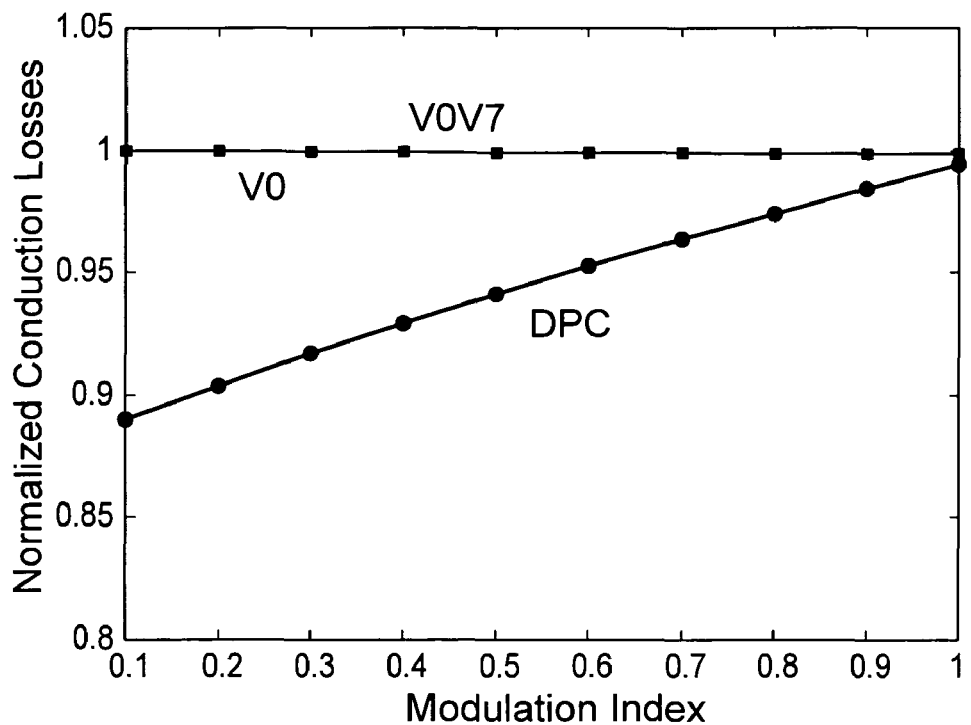
FIG. 6A shows normalized conduction losses versus modulation index.
Figure 6B:
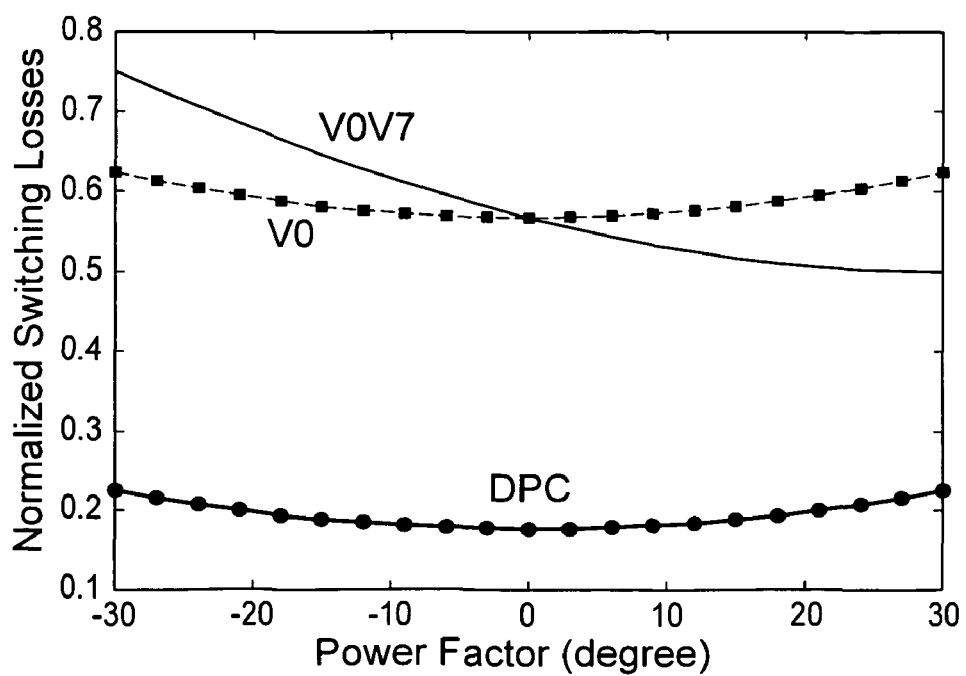
FIG. 6B shows normalized switching losses versus power factor (−30 to +30 degree)

For the DPC 10, example equations for calculating switching losses of two devices on the same leg under slightly lagging load conditions are provided below. Turn-on and turn-off losses of channels and turn-off losses of body diodes due to its reverse recovery are considered using certain assumptions. Parametric results of conduction losses under different modulation indexes and switching losses under different power factors are plotted and compared with that of a VSI. Three state-of-the-art modulation schemes adopted here for the example VSI include ⅙ 3$^{rd}$ harmonic injection, V0 (Direct-direct SVM with 0), and V0V7 (minimum switching loss PWM). All losses are normalized with respect to VSI losses using third-harmonic injection method. As shown in FIG. 6, the ac/ac stage of the example inverter with reduced switching modulation scheme has the lowest conduction and switching losses.

$$P_{TS} = \frac{f \cdot E_{off\_S}}{2\pi} \left( \int_{\theta}^{\pi/6} i_a d(\omega t) + \int_{\pi/6}^{\pi+\theta} i_a d(\omega t) \right) \quad (5)$$

$$P_{BS} = \frac{f \cdot E_{on\_S}}{2\pi} \left( \int_{\pi+\theta}^{7\pi/6} -i_a d(\omega t) + \int_{11\pi/6}^{2\pi+\theta} -i_a d(\omega t) \right)$$

$$P_{BD} = \frac{f \cdot E_{off\_D}}{2\pi} \begin{Bmatrix} \int_{\theta}^{\pi/6} i_a d(\omega t) + \\ \int_{\theta+\pi/6}^{\tan^{-1}(3\sqrt{3})+\theta} \left(i_a + \frac{i_b}{2}\right) d(\omega t) + \\ \int_{\tan^{-1}(3\sqrt{3})+\theta}^{\pi-\tan^{-1}(3\sqrt{3})+\theta} \frac{2}{3} i_a d(\omega t) + \\ \int_{\pi-\tan^{-1}(3\sqrt{3})+\theta}^{5\pi/6} \left(i_a + \frac{i_c}{2}\right) d(\omega t) + \\ \int_{5\pi/6}^{\pi+\theta} i_a d(\omega t) \end{Bmatrix} \quad (6)$$

$$P_{TD} = \frac{f \cdot E_{off\_D}}{2\pi} \begin{Bmatrix} \int_{\pi+\theta}^{7\pi/6} -i_a d(\omega t) + \\ \int_{7\pi/6}^{5\pi/3-\tan^{-1}(3\sqrt{3})+\theta} -\left(i_a + \frac{i_b}{3}\right) d(\omega t) + \\ \int_{5\pi/3-\tan^{-1}(3\sqrt{3})+\theta}^{3\pi/2} \frac{-i_a}{2} d(\omega t) + \\ \int_{3\pi/2}^{3\pi/2+\theta} i_c d(\omega t) + \\ \int_{3\pi/2+\theta}^{4\pi/3+\tan^{-1}(3\sqrt{3})+\theta} \frac{-i_a}{2} d(\omega t) + \\ \int_{4\pi/3+\tan^{-1}(3\sqrt{3})+\theta}^{11\pi/6} -\left(i_a + \frac{i_c}{3}\right) d(\omega t) + \\ \int_{11\pi/6}^{2\pi+\theta} -i_a d(\omega t) \end{Bmatrix} \quad (7)$$

The reaching analyses demonstrate that, the hybrid-modulation based DPC topology suffers no problem with convergence as compared to the VSI topology. It also demonstrates that the VSI topology can only ensure convergence only up to a minimum value of the intermediate capacitance and hence, progressively lower dc-link capacitance of VSI does not make it comparable to the DPC topology.

According to other embodiments of the present invention, example hybrid modulation methods and systems can be used to provide high-power, high-frequency and scalable inverters for power quality and distributed generation. In addition to residential usages with relatively low power rating, fuel-cells are increasingly considered for 1-10 mega-watt applications to support utility distribution circuit or supply stand alone loads. Similar to the low-power case, fuel-cell stacks in this power range most likely will have low voltage (less than 1 kV dc) and high current output characteristics. On the other hand, the desired output voltage is much higher (commonly 12.47 kV ac for the distribution systems in US). The huge gap between these two values makes the design of power electronics inverters, which should have high input current and high output voltage handling capabilities, a significant challenge.

Existing inverters with the aforementioned power ratings usually operate at low switching frequency (around 1 kHz or less) due to the limited turn on/off performances of the high voltage power devices, resulting in bulky and costly magnetics and filters. Recent progress on semiconductor devices, especially on SiC based high voltage devices, makes inverter design with high-frequency switching at 10 kHz or higher a possible and potentially more favorable option than the low-frequency based design.

Connecting multiple power electronics modules with their inputs in parallel and outputs in series is a more viable option than using a single module inverter due to the lack of power semiconductor devices which have such high V-I ratings. The former option can also have relatively higher reliability and redundancy. Isolation among different modules is required to avoid short-circuit, and it is usually achieved by using transformers rather than using multiple input fuel-cell sources, since the latter option may not be available and is usually not cost effective for the power rating of 1-10 MW range.

The conventional high-power dc/ac inverter topologies usually require multiple isolated dc/dc converters with their outputs in series to obtain a high voltage dc bus to feed a following two-level or multi-level dc/ac inverter. Alternatively, a multi-cell cascaded inverter can be used, since isolated dc sources are available.

Figure 7A:
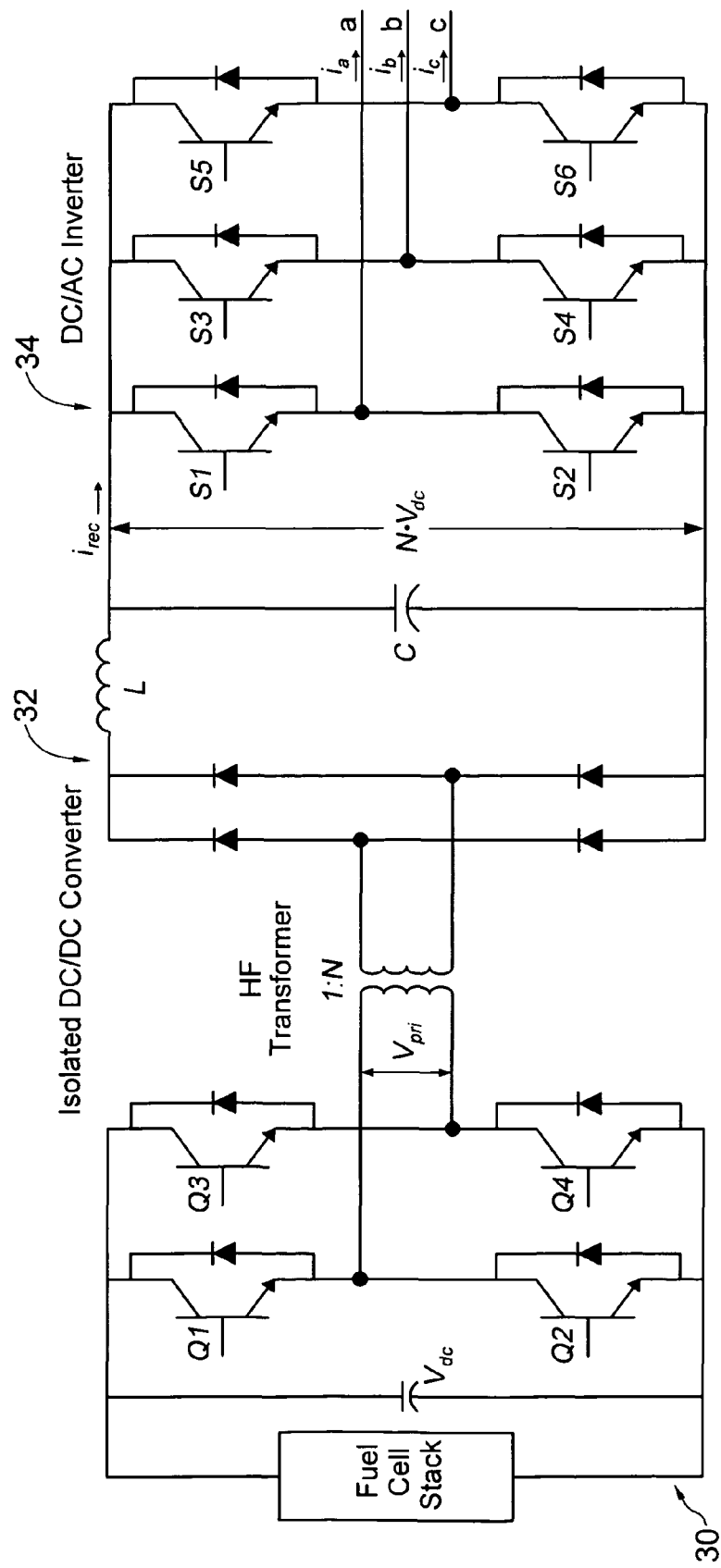
FIG. 7A shows a typical rectifier type inverter module with constant dc bus.

In any case, inductors and capacitors are required for these so-called "rectifier type" inverters to stabilize the dc bus and sink the current if diode rectifiers are used at the front. A typical "rectifier type" inverter module 30 is shown in FIG. 7A, which includes a two-leg full bridge isolated dc/dc converter 32 and a three-phase voltage source inverter 34. The existence of relatively low-life time components L and C on the dc bus not only increases the cost but also reduces the system reliability.

Figure 7B:
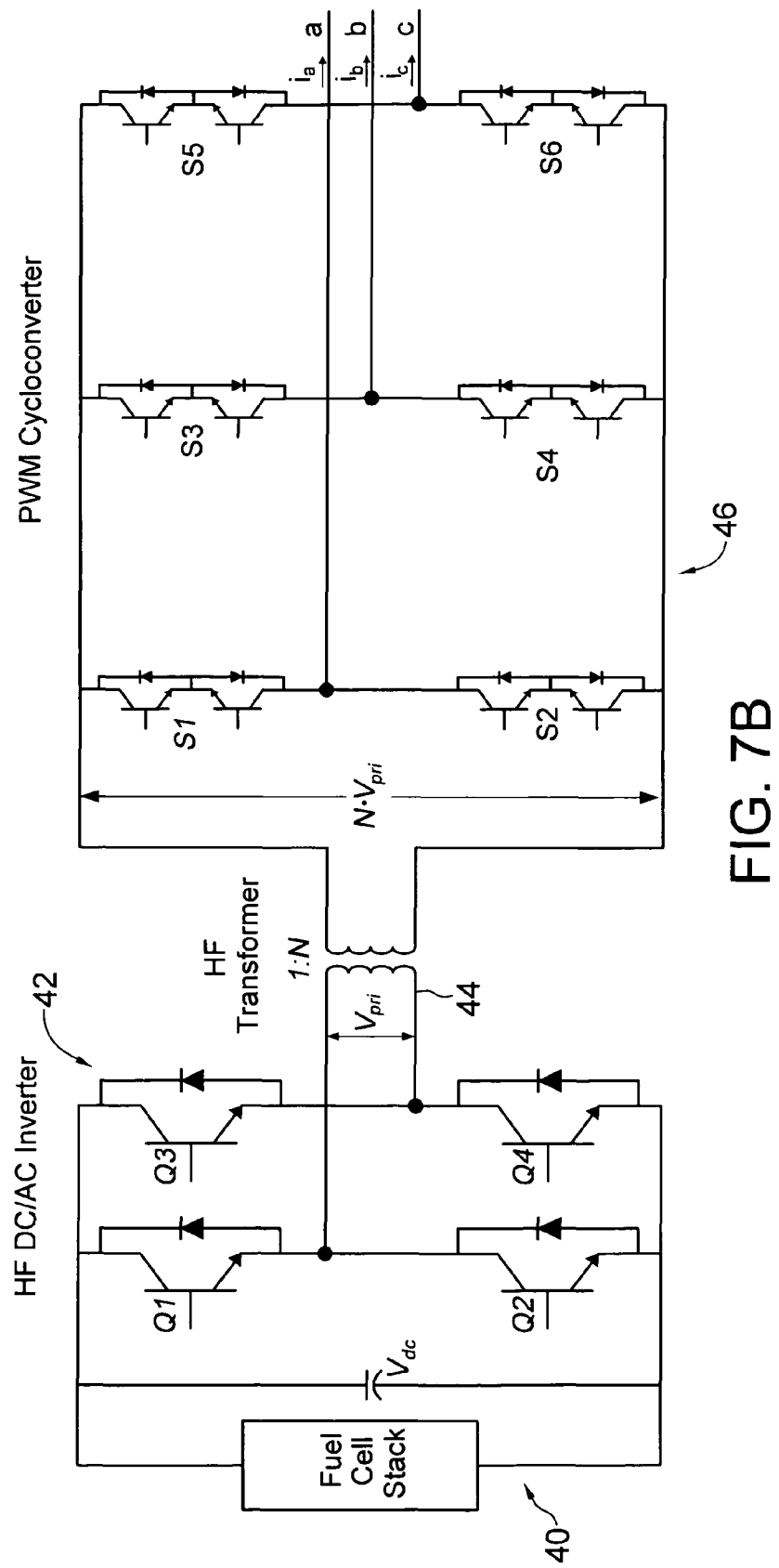
FIG. 7B shows a cycloconverter type inverter module.

Another topology, referred to as a "cycloconverter type converter", reduces the system complexity by removing the dc stage. The circuit 40 shown in FIG. 7B includes a two-leg full bridge inverter 42 followed by a single-phase high-frequency transformer 44 and a three-phase PWM cycloconverter 46. Extension for the higher power can be achieved in two ways: (i) connecting the all modules' transformer secondary sides in series and feeding the obtained ac bus into a three-phase cycloconverter, or (ii) cascading the single-phase cycloconverter outputs to form one phase output. Although it has lesser power conversion stage, the number of active components required especially for the high voltage secondary side is relatively high due to the bidirectional switches for cycloconverters.

According to another embodiment of the present invention, hybrid modulation is used to provide a three-phase single-source high-frequency link isolated rectifier type inverter module that eliminates the need for an inductor or capacitor in its main circuit for high-power fuel-cell based distributed generation applications. As compared to the "cycloconverter type" inverter 40 (FIG. 7B), the example topology has less number of active switchers to achieve three phase output.

Generally, a high-frequency link three-phase dc/ac inverter is provided according to example embodiments for megawatt range applications, as a potential substitute for the conventional low-frequency power electronics inverter. The premise of high frequency operation at high power relies on the availability of high voltage SiC power devices, currently under developmental progress. The example inverter structure and hybrid modulation method achieve low-voltage dc to high-voltage ac conversion without the need of constant dc bus. It can reduce the switching losses of the ac/ac inverter, and enables the scalability for higher power higher voltage applications. An example inverter has less volume, low cost, and relatively high efficiency.

Figure 7C:
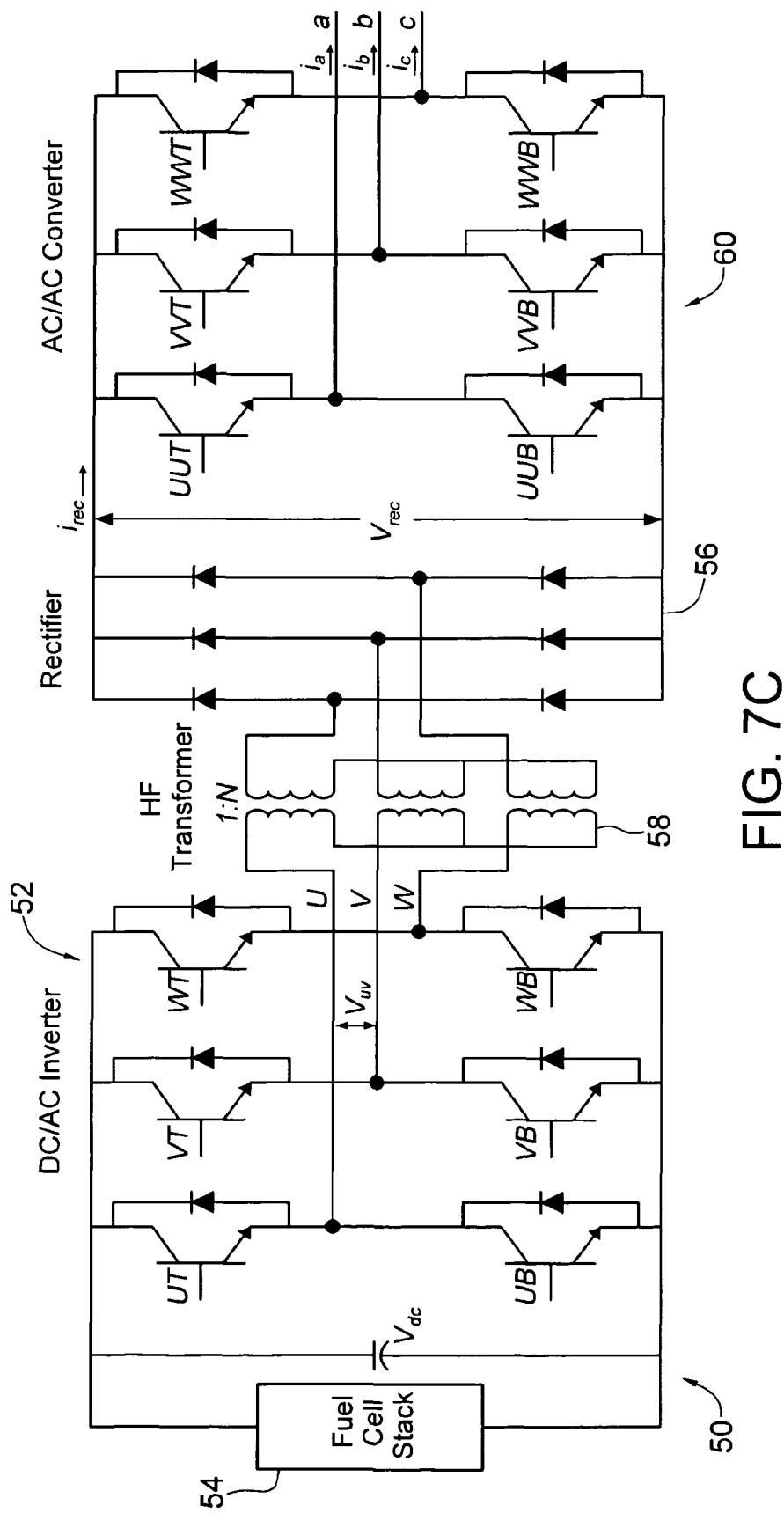
FIG. 7C shows a rectifier type inverter without constant dc bus and with hybrid modulation, according to an embodiment of the present invention.

The circuit schematic of one module 50 of an example inverter is shown in FIG. 7C. The module 50 comprises three stages of power conversion: 1) a high-frequency (10 kHz) sinusoidal phase-shift-modulated zero-voltage turn-on full-bridge inverter 52, which interfaces to a low-voltage and high-current fuel-cell stack 54; 2) a three-leg diode rectifier 56 that transforms the bipolar ac voltage at the secondary of the high-frequency transformer 58 to a unipolar 20 kHz pulsating waveform (which has a 6-pulse envelope); and 3) an ac/ac converter 60 that converts the pulsating output of the rectifier to an line-frequency ac output using pulse-width modulation. The high-frequency transformers 58 in FIG. 7C provide galvanic isolation, boost the input-side voltage, and enable series connection of multiple modules without short circuit.

According to an embodiment of the present invention, the final stage ac/ac converter 60 is switched in a hybrid manner. Thus, only at one-third of one period time the devices are operating with high-frequency (20 kHz) while they stay at either ON or OFF for the rest of the time. This fundamental difference in switching strategies of the inverter leads to lower switching losses. The example inverter 50 can support a load power factor angle up to ±30 degrees, and may support up to 60 degrees or more. Adding anti-parallel switchers to the rectifier diodes 56 provides four-quadrant operation. Unidirectional and/or bidirectional power flow may be provided. The inverter 50 module can be easily extended to higher voltage or higher power as will be described below.

Figure 8:
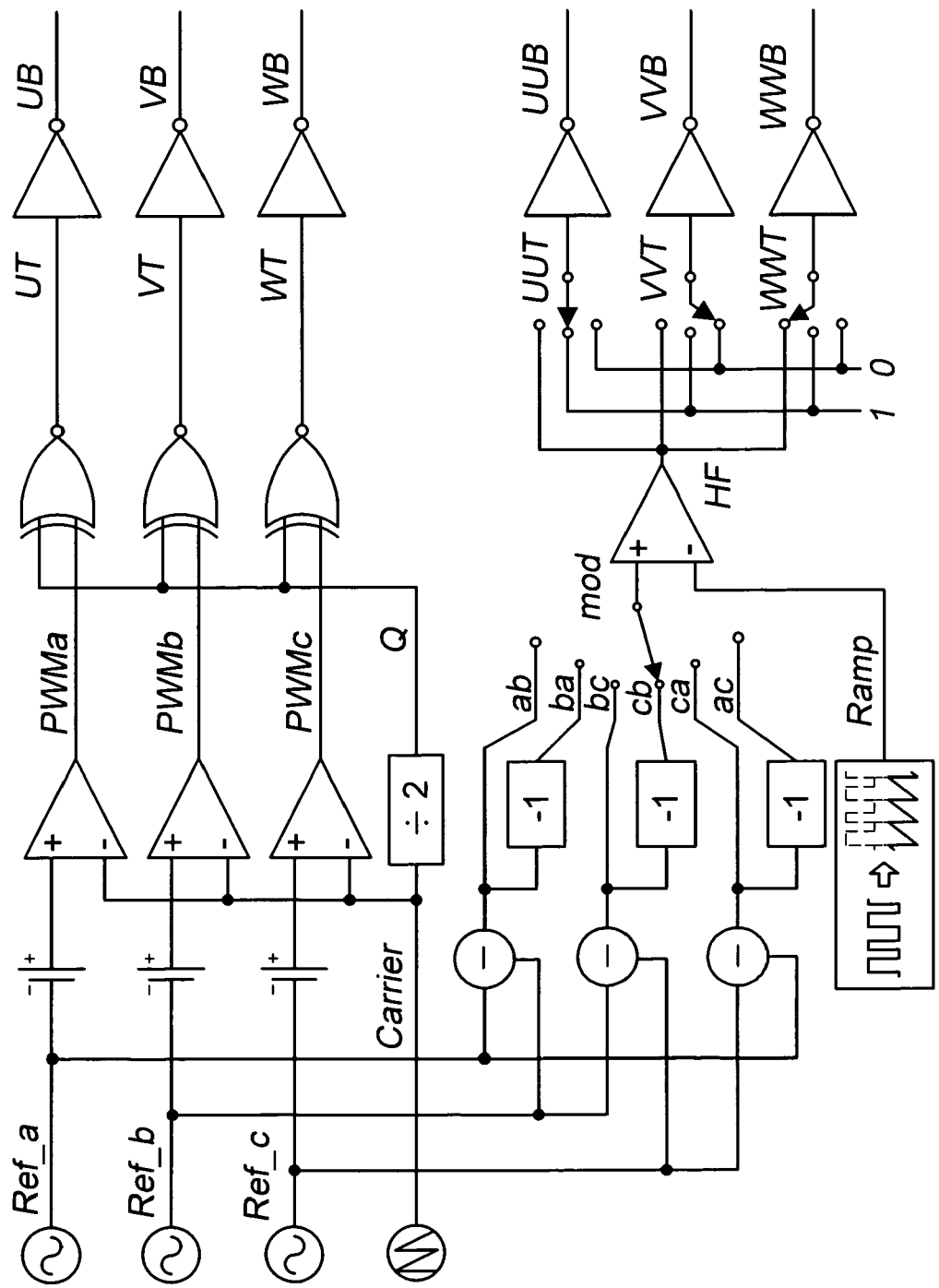
FIG. 8 shows gate drive signal generation for an example inverter using hybrid modulation.

FIG. 8 illustrates the generation of switch gate signals for the example inverter module 50. The bottom switches are controlled complimentarily to the upper ones, and hence they are not described further herein. Three gate-drive signals UT, VT and WT for primary side devices are obtained by phase shifting a square wave with respect to a 10 kHz square wave signal Q, shown in FIG. 9B. Q is synchronous with a 20 kHz sawtooth carrier signal, shown in FIG. 9A. The phase differences are modulated sinusoidally using three 60 Hz references a, b and c respectively.

Figures 9A, 9B, 9C, 9D, 9E, 9F:
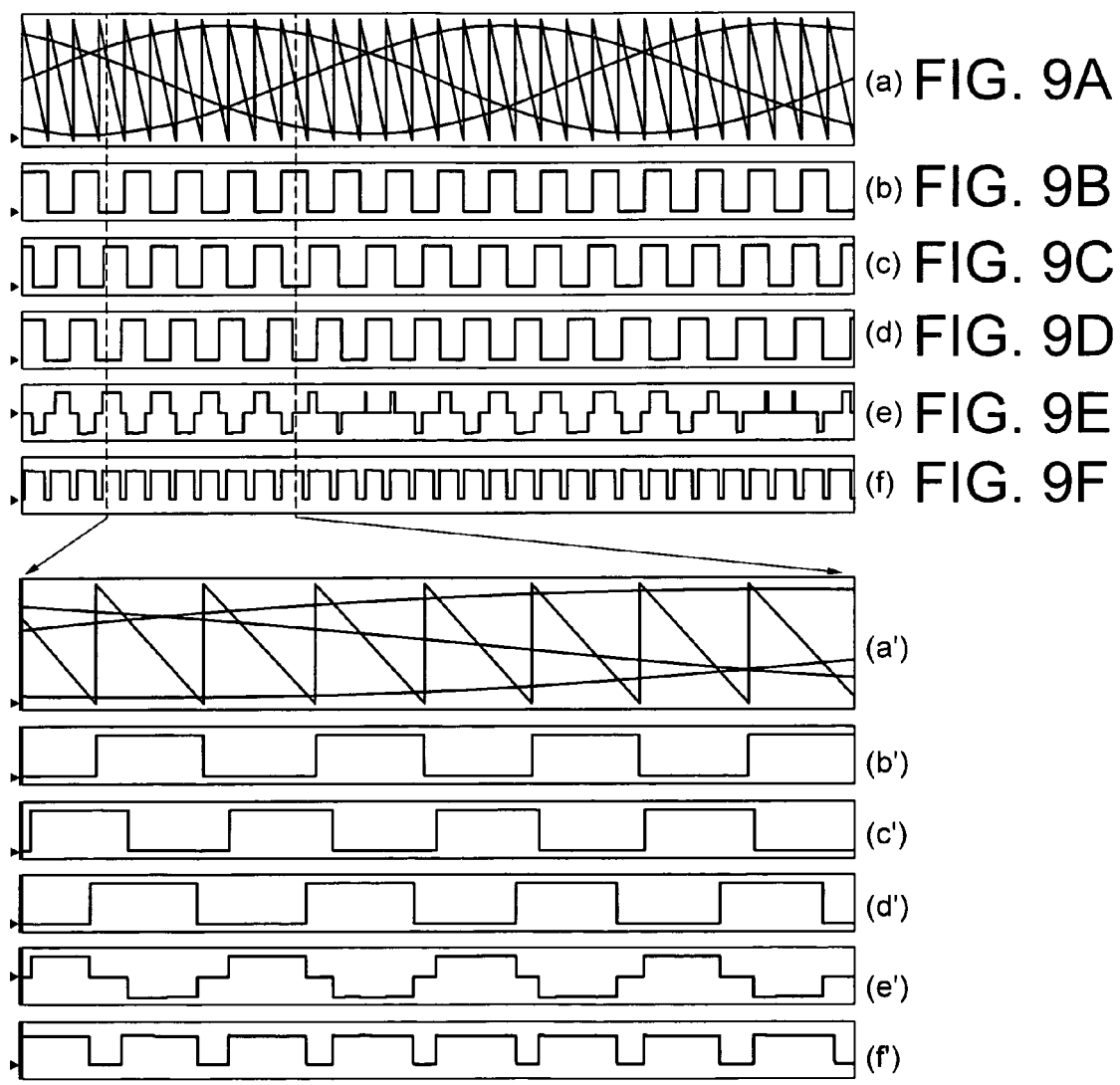
FIGS. 9A-9F show waveforms of a primary dc/dc inverter in one cycle, with an enlarged view of a portion, where

Two gate signals for phase U and V are plotted in FIGS. 9C and 9D. Since carrier frequency is much higher than the reference frequency, UT, VT and WT will be square wave with the frequency of 10 kHz and their phases are modulated. The obtained output line-line voltages at the primary side of the transformers are bipolar waveforms. $V_{uv}$ is plotted in FIG. 9E as an example. After passing through the high-frequency transformers 58, they are rectified by the three-leg diode bridge 56 at the secondary side to obtain a unipolar PWM waveform, which has six-pulse envelop. Its example waveform is shown in FIG. 9G and the mathematic expressions are:

$$V_{rec} = N \cdot V_{dc} \cdot \text{MAX}(|UT - VT|, |VT - WT|, |WT - UT|) \quad (8)$$

$$UT = \overline{Q \otimes PWM_a} \quad (9)$$

$$VT = \overline{Q \otimes PWM_b} \quad (10)$$

$$WT = \overline{Q \otimes PWM_c} \quad (11)$$

where, $PWM_x$ (x=a, b or c) denotes the binary comparator output between reference and carrier for phase x. Symbol "⊗" stands for XNOR operation. N is the transformer turns ratio.

Figure 10A:
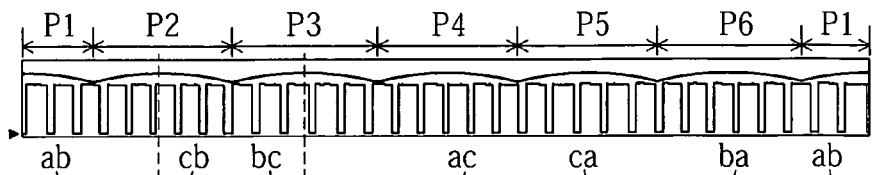
FIGS. 10A-10F show waveforms of a secondary side ac/ac inverter, with an enlarged view of a portion, where
Figure 10B:
Figure 10C:
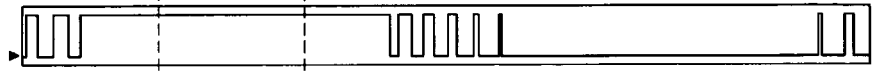
Figure 10D:
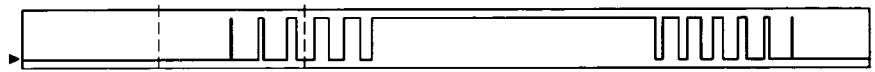
Figure 10E:
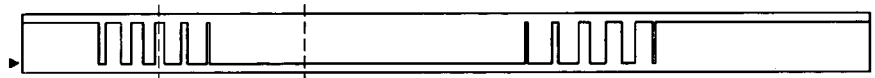
Figure 10F:
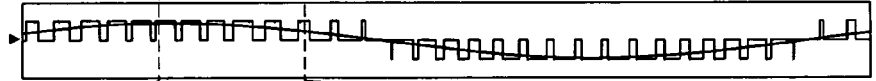

Divide the six-pulse rectified waveform into six segments named P1~P6 as shown in FIG. 10G. The rising and falling edges of $V_{rec}$ are different for different segments. FIGS. 9A'-9F' show a particular time interval within segment P2, where the rising and falling edges of $V_{rec}$ (marked as ↑$V_{rec}$ and ↓$V_{rec}$) are determined by the edges of UT and VT respectively. Other cases are summarized in Table II.

TABLE II

THE EDGE DEPENDENCE OF THE RECTIFIER OUTPUT ON GATE SIGNALS

|  | P1 | P2 | P3 | P4 | P5 | P6 |
|---|---|---|---|---|---|---|
| ↑$V_{rec}$ | wt | ut | ut | vt | Vt | wt |
| ↓$V_{rec}$ | Vt | vt | wt | wt | Ut | ut |

Similarly to the case of a three-phase ac/dc rectifier, the rectified PWM output is contributed respectively by $V_{wv}$, $V_{uv}$, $V_{uw}$, $V_{vw}$, $V_{vu}$, and $V_{wu}$ at each segment from P1 to P6. The bottom part of FIG. 8 shows an example generating of switching signals for three upper switchers of the secondary side ac/ac inverter 60. During each segment, every switch will be either: permanently ON ("1"), permanently OFF ("0") or toggling with 20 kHz ("HF"). The switching pattern for the upper three switches in each segment for one example cycle period is summarized in Table III.

TABLE III

SWITCHING PATTERN FOR UPPER SWITCHES OF THE AC/AC INVERTER

| | P1 | P2 | P3 | P4 | P5 | P6 |
|---|---|---|---|---|---|---|
| $V_{rec}$ (g) | $V_{wv}$ | $V_{uv}$ | $V_{uw}$ | $V_{vw}$ | $V_{vu}$ | $V_{wu}$ |
| UUT (i) | HF | ON | ON | HF | OFF | OFF |
| VVT (j) | OFF | OFF | HF | ON | ON | HF |
| WWT (k) | ON | HF | OFF | OFF | HF | ON |
| mod (h) | Ab | cb | bc | ac | Ca | Ba |
| $i_{rec}$ | $(i_a + i_c, i_c)$ or $(-i_b, i_c)$ | $(i_a + i_c, i_a)$ or $(-i_b, i_a)$ | $(i_a + i_b, i_a)$ or $(-i_c, i_a)$ | $(i_b + i_a, i_b)$ or $(-i_c, i_b)$ | $(i_b + i_c, i_b)$ or $(-i_a, i_b)$ | $(i_c + i_b, i_c)$ or $(-i_a, i_c)$ |
| $i_{rec} > 0$ | $i_b < 0 \rightarrow$ <30° lagging $i_c > 0 \rightarrow$ <30° leading | $i_a > 0 \rightarrow$ <30° lagging $i_b < 0 \rightarrow$ <30° leading | $i_c < 0 \rightarrow$ <30° lagging $i_a > 0 \rightarrow$ <30° leading | $i_b > 0 \rightarrow$ <30° lagging $i_c < 0 \rightarrow$ <30° leading | $i_a < 0 \rightarrow$ <30° lagging $i_b > 0 \rightarrow$ <30° leading | $i_c > 0 \rightarrow$ <30° lagging $i_a < 0 \rightarrow$ <30° leading |

The switch positions illustrated at FIG. 8, for example, are for the case of segment P2. Since the rectifier output has the same shape as $V_{uv}$ within this interval, the line-line voltage $V_{ab}$ at the output side of the ac/ac inverter can be directly obtained by keeping switchers UUT and VVT at ON and OFF status respectively. Another line-line voltage $V_{cb}$, however, needs to be achieved by operating switches on the third leg WWT and WWB in a high-frequency way where modulated signal ("mod") is the difference between reference c and b and the carrier signal ("ramp") is a 20 kHz saw-tooth waveform synchronized with the PWM output of the rectifier. The key waveforms are shown in FIG. 10. The mathematical expressions for three line-line voltages are given as follows:

$$V_{ab} = V_{rec} \cdot (UUT - VVT) \quad (12)$$

$$V_{cb} = V_{rec} \cdot (WWT - VVT) \quad (13)$$

$$V_{ca} = V_{cb} - V_{ab} \quad (14)$$

The example converter topology along with the specific example modulation scheme allows a certain phase displacement between the output current and voltage without using any dc link capacitor or additional active switch. It is up to 30 degree for a balanced three-phase system with the assumption that the output phase currents are line frequency sine-waves.

Under this example hybrid modulation scheme, at any time, either one or two of all three upper switches of the ac/ac converter will conduct. The current $i_{rec}$ will swing between one phase current and the sum of this current and another phase current depending on which segment the converter is locating at. For example, $i_{rec}$ pulsates between $i_a$ and $i_a + i_c$ at segment P2 since UUT is always on, VVT is always off, while WWT is switching. Similarly, $i_{rec}$ varies between $i_a$ and $i_a + i_b$ for segment 3. Row 7 of Table III summarizes cases for all segments.

The fact that $i_{rec}$, the output current of the diode rectifier, should not less than zero results in limitation on load power factor. The maximal phase discrepancies for all segments are listed in Table III row 8. In any case, a maximal 30 degree leading or lagging load can be supported in this example. By adding anti-parallel active switches for all six diodes, the example converter can achieve four-quadrant operations without any reactive components in the main circuit.

Figure 11A:
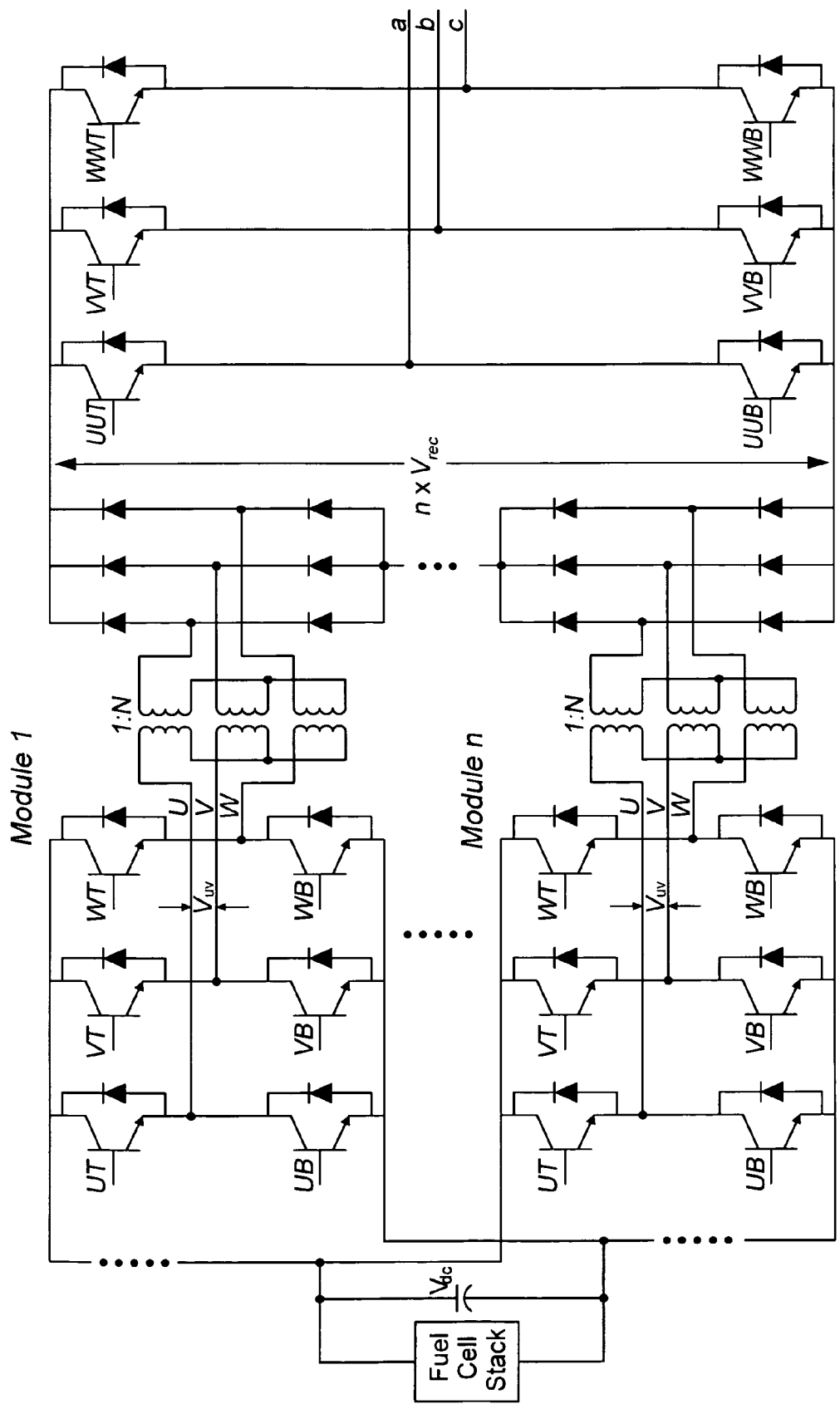
FIG. 11A shows N modules of dc/ac inverters followed by a two-level ac/ac inverter.
Figure 11B:
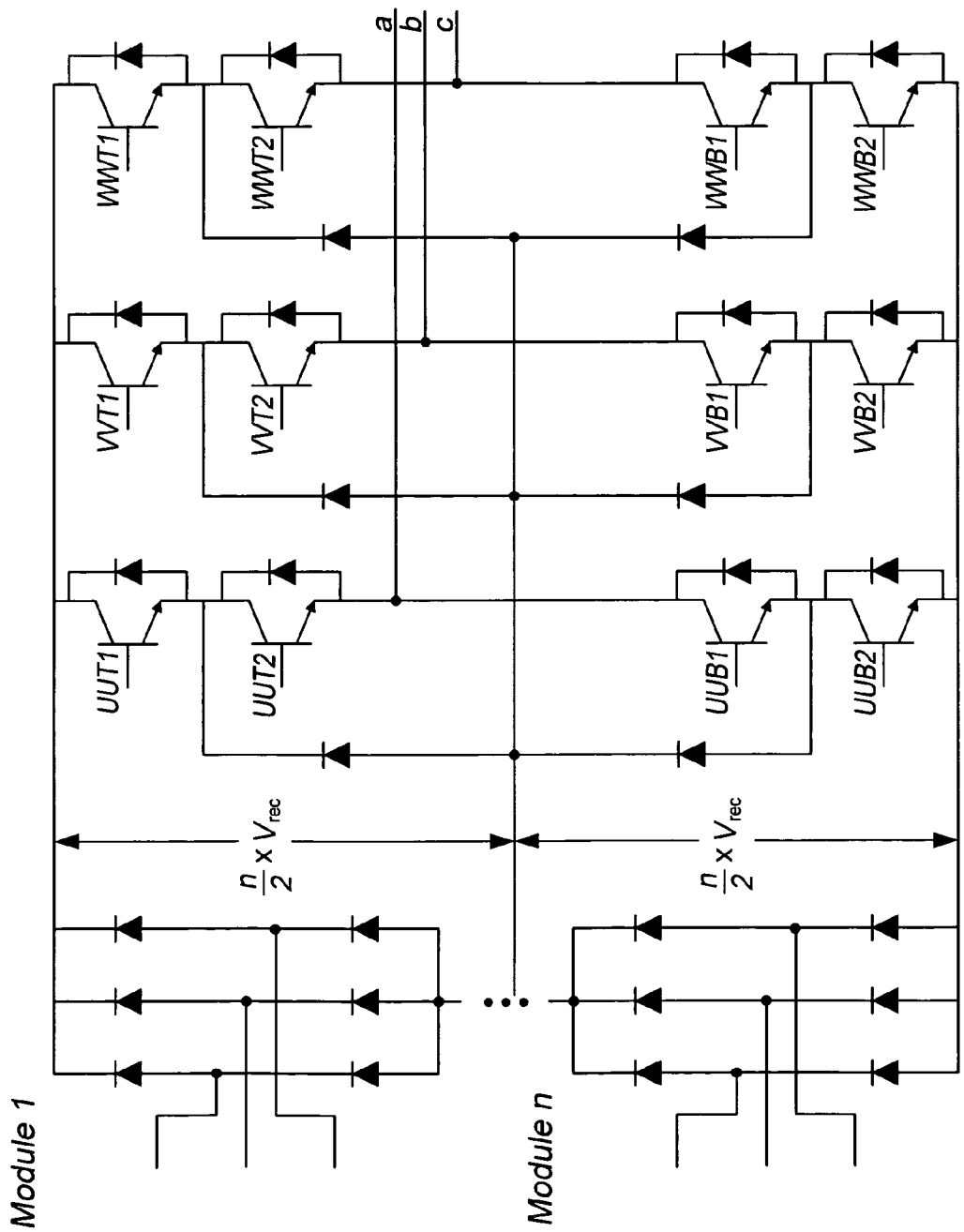
FIG. 11B shows N modules of dc/ac inverters followed by a three-level diode-clamped (NPC) inverter.

N modules can be easily connected together to achieve N times higher power rating by paralleling their inputs and connecting their outputs of rectifiers in series. All modules will share currents from the common fuel-cell stack. The final stage ac/ac inverter can remain the same two-level structure, as shown in FIG. 11A, in which the switch can be implemented using either single high voltage rating device or several low voltage rating devices in series. It can also be configured as a multi-level structure. FIG. 11B shows an alternative configuration for the final ac/ac stage using a three-level diode-clamped (NPC) inverter. The voltage stresses of devices will be reduced by half as compared to the case of two-level.

According to other example embodiments of the present invention, soft-switching methods and systems are provided for an isolated dc/dc converter. High efficiency, low cost, and high power density are important attributes of a low-input-voltage three-phase converter (fed with a low-voltage dc source), such as but not limited to battery based three-phase uninterruptible power supply (UPS), naval bi-directional power conversion modules (PCMs), fuel-cell powered electric motor drive, distributed generation (DG) systems with renewable energy sources, and others. Galvanic isolation is typically mandatory for safety concerns and voltage and current scalability, and in that regard, a high-frequency transformer-based approach can be a preferable choice from the standpoint of weight, footprint, and cost reduction.

Among all possible topologies, a high-frequency-link (HFL) pulse-width modulated (PWM) converter can eliminate the intermediate LC filter that is needed for a conventional high-frequency (HF) fixed-dc-link converter approach. Further, as compared to a resonant-link inverter, it yields lower switch stress, better THD, and a simpler all-device structure (i.e. no passive components in power stages). Thus, the PWM HFL converter approach is better suited from the viewpoints of cost, efficiency and portability.

Two typical HFL converter topologies have been considered in the art. One proposed topology is a cycloconverter-type HFL (CHFL) converter, which reduces the conversion complexity by directly placing a three-phase PWM cycloconverter to the secondary side of an HF transformer. The other topology is known as a rectifier-type HFL (RHFL) converter. It possesses a structure similar to that of a conventional fixed-dc-link converter except for the absence of the dc-link filter. Although the RHFL converter includes an extra rectifier stage, overall, it requires fewer switches since it does not need to handle bi-directional voltage.

Figure 12:
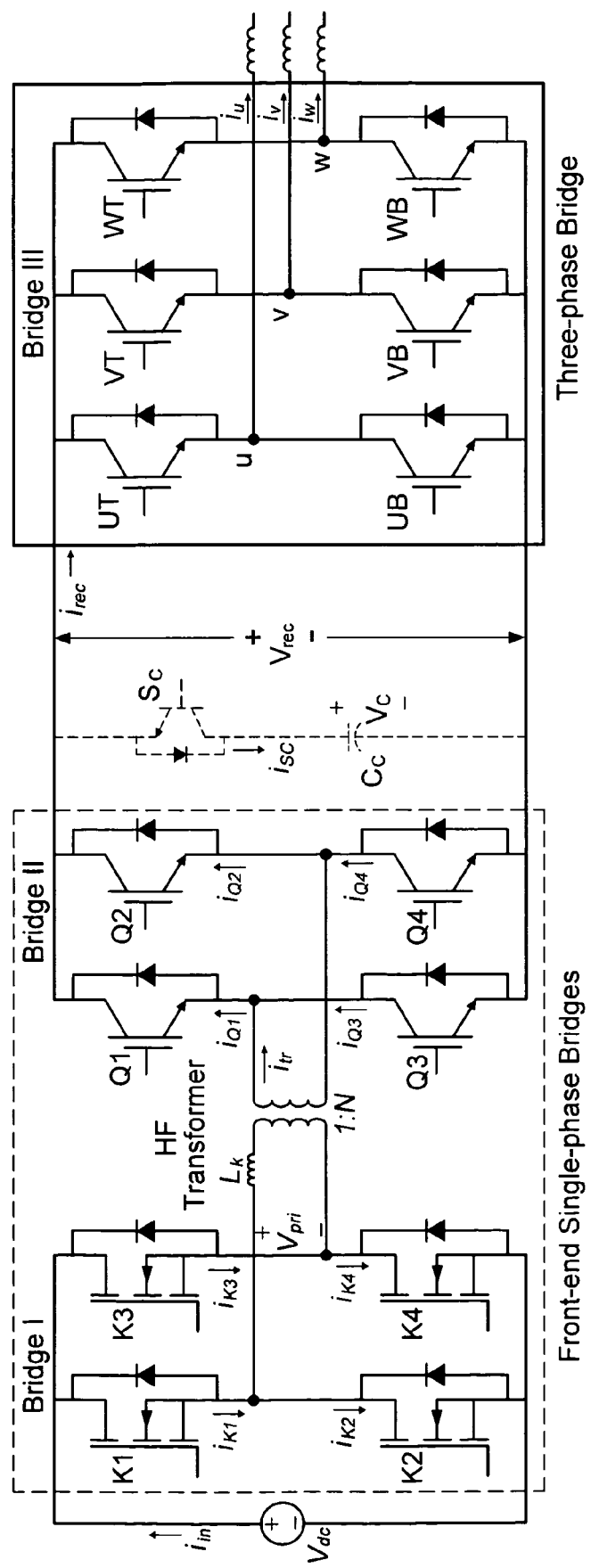
FIG. 12 shows a schematic of a typical rectifier-type high-frequency-link (RHFL) converter.

A typical three-phase RHFL converter 70 is illustrated in FIG. 12. It includes two full-bridges, Bridges I and II, as the front-end followed by an HF transformer and an ac/ac full-bridge (Bridge III) as the final stage. This voltage-source-inverter (VSI) like structure provides inherent free-wheeling paths in Bridge III, which simplifies its switching scheme, precluding the possibility of disruption of the load current due to open circuit. Furthermore, the auxiliary circuit, which is commonly used in an HFL converter to recover the transformer leakage energy and/or to limit the secondary-side overvoltage, can be simplified. Nevertheless, the RHFL converter may suffer from additional switching losses because of three-stage HF operation.

To address this problem, several switching schemes have been proposed for achieving soft-switching without using any additional components. The conventional method is to implement a square-wave modulation on Bridges I and II, and apply one of many well-established continuous sine-wave modulation schemes to Bridge III. All associated switches on Bridges I and II turn-on and turn-off during the zero-vector intervals of Bridge III to achieve zero-current switching (ZCS). The normally-used schemes for Bridge III are continuous sinusoidal PWM (SPWM) and space-vector modulation (SVM). However, Bridge III still experiences significant switching losses owing to the usage of slow-speed high-voltage semiconductor devices that operate under hard-switching conditions.

Some discontinuous-modulation schemes, which were originally proposed for fixed-dc-input VSI, can be utilized for Bridge III to partially reduce its switching losses by allowing no switching on one of its three legs. The ZCS of front-end bridges is still applicable. A zero-voltage switching (ZVS) scheme has also been proposed, which can partially reduce switching losses of Bridge III by aligning the commutation edges of the devices with the zero-input-voltage intervals. However, this method violates the ZCS condition for front-end switches and may not be very effective.

According to additional embodiments of the present invention, a soft-switching mechanism is provided based on a zero-voltage-zero-current-switching (ZVZCS) principle for a front-end isolated dc/dc converter of an isolated three-phase rectifier-type high-frequency-link (RHFL) bi-directional power converter. By using a back-end ac/ac converter operating with hybrid modulation to reduce the number of hard-switched commutation per switching cycle, the example ZVZCS scheme can lead to less overall switching loss as compared to conventional switching schemes. Example ZVZCS devices and methods are effective for various load conditions, operate seamlessly with a simple active-clamp circuit, and are suitable for applications where low-voltage dc to high-voltage three-phase ac power conversion is required.

An example soft-switching scheme to further reduce the overall switching losses for the front-end isolated dc/dc converter of the overall RHFL converter relies on shifting the three-phase sinusoidal modulation into primary side. The example soft-switching scheme enables ZVZCS for all switches on two front-end bridges, and is valid for various load conditions and bipolar load current.

The conventional switching scheme applies a square-wave modulation on the front-end bridges such that Bridge III can be treated as a fixed-dc-input VSI although its input is not strictly a dc. Various types of SPWM or SVM schemes can be utilized to modulate Bridge III, and the zero-current switching of both front-end bridges can be achieved by switching the associated switches during the zero-vector intervals of Bridge III.

Figure 13A:
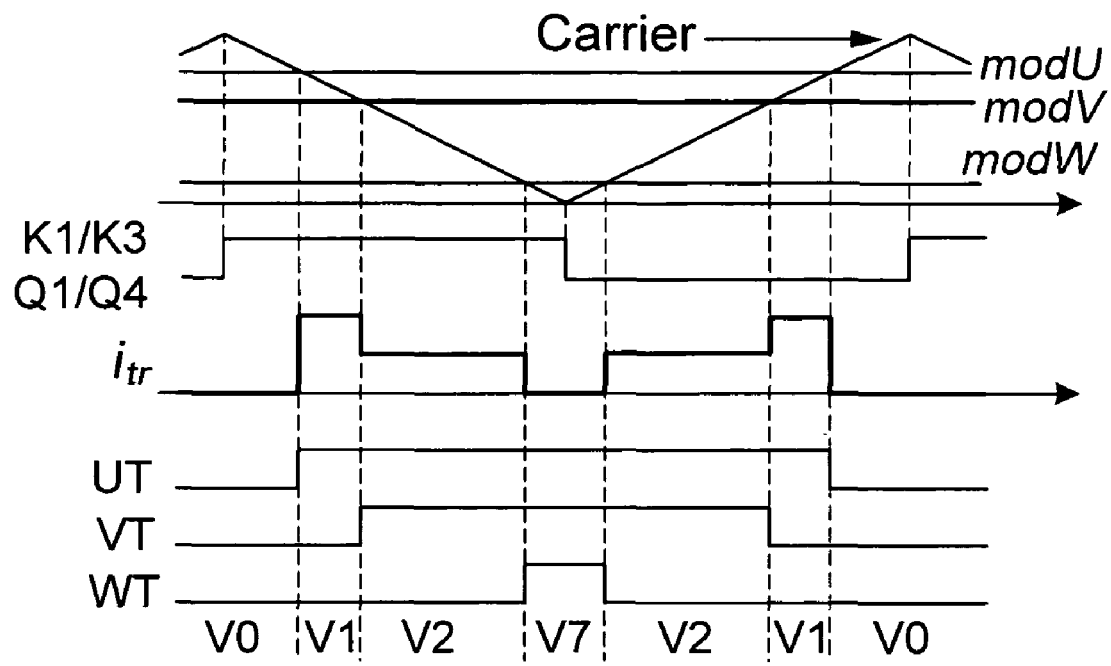
FIGS. 13A-13B show gate signals and transformer current in one switching cycle for a RHFL converter with square-wave modulation on front-end bridges and two different schemes on Bridge III, where

FIG. 13A illustrates this mechanism, showing gate signals of switches K1, K3, Q1, and Q3, gate signals of three upper switches of Bridge III, and $i_{tr}$ (transformer current) of the RHFL converter. Bridge III is modulated using a carrier-based SPWM with third-harmonic injection that is one sixth of the fundamental waveform in magnitude. This scheme is referred to herein as "SPWM-3$^{rd}$". All switches on Bridges I and II are turn-on and turn-off during zero-vector intervals of Bridge III (see zero vectors V0 and V7 in FIG. 13A). During that time interval, all of the upper switches (UT, VT, WT) or all of the lower switches (UB, VB, WB) of Bridge III are on, as represented by V7 or V0. Further, during these zero-vector intervals, load currents circulate inside Bridge III, causing a zero $i_{tr}$. Therefore, switches K1 through K4 and Q1 and Q4 operate under ZCS. As with other example hybrid modulation methods described above, switches of Bridge III commutate six times per switching cycle under hard-switching conditions.

Figure 13B:
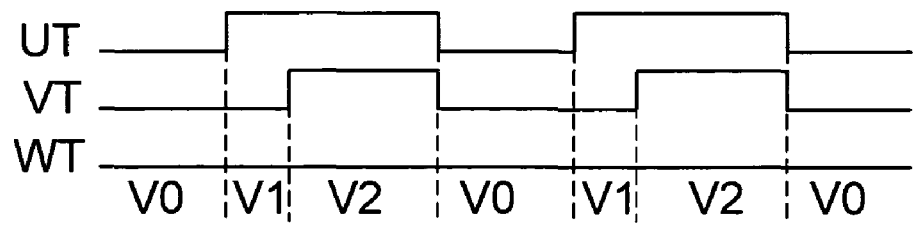

Some discontinuous SVM schemes, initially considered for fix-dc-link VSI, can also be adopted for Bridge III to reduce its switching loss without affecting the ZCS of Bridges I and II. These schemes differ on how to place V0 and V7. FIG. 13B shows gate signals for switches UT, VT and WT when Bridge III is modulated using a discontinuous-SVM scheme, which uses only V0. For this scheme, at any instant of time, only one of the legs of Bridge III does not switch. Herein, this scheme is referred to as "DIS-V0".

Another popular SVM scheme, also known as "minimum-switching-loss-PWM", alternatively uses V0 and V7 at each of the six adjacent sectors in one line cycle. This method has two variations: one, which is suitable for inductive loads; and the other, which is suitable for capacitive loads. For both these schemes, at any instant of time, only one of the legs of Bridge III does not switch. Herein, these schemes will be referred to as "DIS-V7V0" and "DIS-V0V7", respectively.

The overall HFL converter 70 illustrated in FIG. 12 operates with a ZVZCS scheme for Bridges I and II, an example of which will now be described. Hybrid modulation is used for Bridge III, such as the example hybrid modulation methods described herein.

Figure 14:
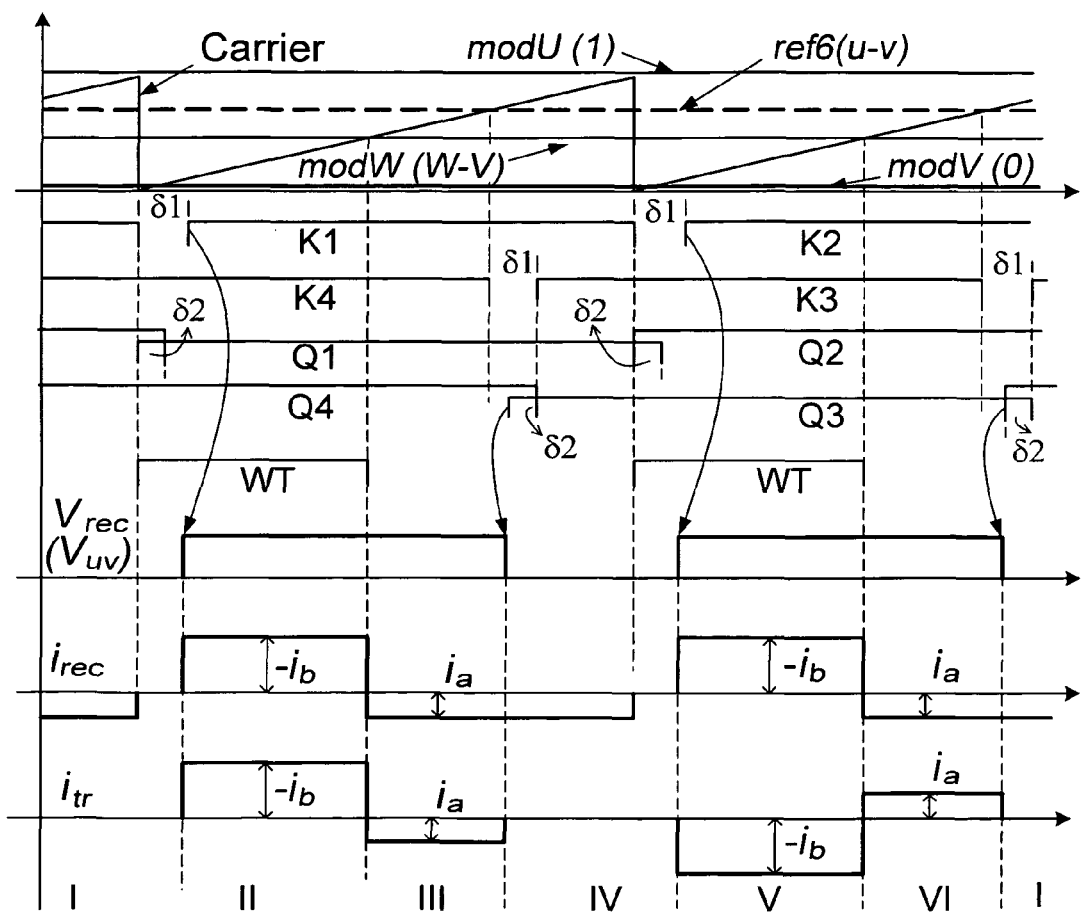
FIG. 14 shows gate signals, Bridge II output voltage and current, and transformer current in one switching cycle for the RHFL converter in FIG. 12 operating with an example ZVZCS scheme according to an embodiment of the present invention.

FIG. 14 illustrates operation of the example HFL converter by plotting some gate signals, Bridge-II output voltage and current, and transformer current. As shown in FIG. 14, K1 and K2 and Q1 and Q2 are synchronized with the saw-tooth carrier (2 $f_s$ Hz), while K3 and Q3 and K4 and Q4 are phase shifted with respect to K1 and K2. The phase shift is adjusted by a six-pulse reference, ref6(t) (spread across six regions P1-P6) and is obtained by rectifying a three-phase ac signal defined in equations (15) and (16).

$$ref6(t) = \begin{cases} w(t) - v(t) & P1: \quad -\pi/6 \le \omega t < \pi/6 \\ u(t) - v(t) & P2: \quad \pi/6 \le \omega t < \pi/2 \\ u(t) - w(t) & P3: \quad \pi/2 \le \omega t < 5\pi/6 \\ v(t) - w(t) & P4: \quad 5\pi/6 \le \omega t < 3\pi/2 \\ v(t) - u(t) & P5: \quad 7\pi/6 \le \omega t < 3\pi/2 \\ w(t) - u(t) & P6: \quad 3\pi/2 \le \omega t < 11\pi/6 \end{cases} \quad (15)$$

$$\begin{cases} u(t) = m \cdot \sin(\omega t) \\ v(t) = m \cdot \sin\left(\omega t - \dfrac{2\pi}{3}\right) \\ w(t) = m \cdot \sin\left(\omega t + \dfrac{2\pi}{3}\right) \end{cases} \quad (16)$$

where u(t), v(t) and w(t) in equations (15) and (16) are the three-phase voltage references with amplitude m. For a unity-amplitude carrier, m is less than 0.577 for the converter to operate below over-modulation region.

Practically, a small dead time δ1 is added to the complementary switches of Bridge I to prevent the short circuit of input voltage source, and a small overlap time δ2 is added to the complementary switches of Bridge II to avoid the open circuit of load current. As observed from FIG. 14, δ1 is larger than δ2 to preclude short circuiting of Bridge-I output by Bridge II.

The zero-voltage regions on $V_{rec}$ (I and IV in FIG. 14) allow ZVS operation of switches at the transformer secondary side. Furthermore, as will be explained below, the transformer current $i_{tr}$ remains zero during the zero-voltage regions, and thus provides possibility of ZCS on Bridge I.

Either Bridge I or II will act as a diode rectifier depending on the polarity of $i_{rec}$, the input current to Bridge III. For positive $i_{rec}$, diodes on Bridge II conduct, otherwise diodes on Bridge I conduct. In either case, current of a diode will decay to zero during the zero-voltage zero-current (ZVZC) region and before it sustains reverse-bias voltages. Therefore, diodes of both bridges have lossless turn-off, which eliminates reverse recovery problems.

Implied from FIG. 3, the starting point of a ZVZC region is determined by the turn-off edge of K4 or K3 if $i_{rec} \geq 0$ at the beginning of the region, or by the turn-on edge of Q3 or Q4 if $i_{rec} < 0$. On the other hand, the ending point of a ZVZC region is determined by the turn-on edge of K2 or K1 if $i_{rec} \geq 0$ right after the region, or by the turn-off edge of Q1 or Q2 if $i_{rec} < 0$. In any case, due to the existence of dead time $\delta 1$, a rising edge of K3 or K4 and a falling edge of K2 or K1 are always located inside a ZVZC region. Therefore, switches K3 and K4 will have ZCS on, and K1 and K2 will have ZCS off. Similarly, because of the existence of overlap time $\delta 2$, switches Q1 and Q2 will always have ZVS on, and Q3 and Q4 have ZVS off.

This example switching scheme enables a seamless transition between Bridge I ZCS and Bridge II ZVS according to the polarity of output current of Bridge II ($i_{rec}$) without sensing any current or voltage, and therefore it is effective for various load conditions. For a three-phase RHFL converter, $i_{rec}$ normally experience abrupt changes in magnitude and polarity during a switching period. It is unlike the case in a high-frequency-switched dc/dc (unidirectional or bidirectional) or a single-phase dc/ac converter, where the output current of the rectifier stage can be regarded as constant.

Furthermore, the active-clamp circuit used in this example scheme can have multiple functions. It can recover the stored leakage energy and limit the overvoltage spikes caused by the resonance between the leakage inductance and the parasitic capacitance. It can also enable a ZVS turn-on for switches Q3 and Q4.

Example ZVZCS operations under various load conditions with an active-clamp circuit will now be discussed. Some assumptions are made for clarity:

1) Although MOSFETs are applicable, IGBTs are chosen for Bridges II and III along with anti-parallel diodes. The current is considered separately for each IGBT and diode. Switch current of Bridge I will not be separated. Switches on all bridges are assumed to be ideal except when switching losses need to be considered. The definition of variables and their positive directions are given in FIG. 12.

2) Dead time needed for two complementary switches on the switching leg of Bridge III is not considered here.

3) Load currents are assumed three balanced sinusoidal waveforms with amplitude of I.

$$\begin{cases} i_u(t) = I \cdot \sin(\omega t - \varphi) \\ i_v(t) = I \cdot \sin\left(\omega t - \varphi - \frac{2\pi}{3}\right) \\ i_w(t) = I \cdot \sin\left(\omega t - \varphi + \frac{2\pi}{3}\right) \end{cases} \quad (17)$$

$\varphi$ in (17) is the phase displacement between a phase current and the corresponding phase voltage.

4) The analysis given below is based on the conditions with inductive loads ($\varphi > 0$) but also applicable for capacitive loads.

5) Due to the three-phase symmetry, only two segments P2 and P3 are described. Operations in P4 and P6 are similar to P2, while operations in P1 and P5 are similar to P3.

Waveforms of gate signals, current of clamp capacitor $i_{sc}$, and its voltage $V_c$ and transformer current $i_{tr}$ are sketched on a switching cycle basis for the case of $\phi \in [0, \pi/6]$ (FIG. 15, small inductive load conditions) and $\phi \in [\pi/6, \pi/2]$ (FIG. 16, large inductive load conditions). For each figure, waveforms on the left part show a full-cycle operation in P2 ($\omega t \in [\pi/6, \pi/2]$), while waveforms on the right show a half-cycle operation at P3 ($\omega t' \in [\pi/2, 3\pi/5]$). The starting points in P2 and P3 are marked as $t_1$ and $t_1'$. The phase distance between $t_1$ and the beginning of P2 ($\pi/6$) equals the distance between $t'_1$ and the beginning of P3 ($\pi/2$).

$$t_1 - \frac{\pi}{6} = t_1' - \frac{\pi}{2} \quad (18)$$

The switch of active-clamp circuit $S_c$ (shown in FIG. 12 with dotted line) turns on before the falling edge of K3 or K4, and remains on for a small time of $\delta 3$. It turns off before the turn-on of switches Q3 or Q4 to avoid short-circuit of the clamp capacitor $C_c$. $V_c$, the voltage of capacitor $C_c$, is assumed fixed. Three-phase filter inductor currents $i_u$, $i_v$, $i_w$ as defined in equation (17) are assumed constant within one switching cycle and can be written as:

$$\begin{cases} i_u(t) = -i_w(t') = i_a \\ i_v(t) = -i_u(t') = i_b \\ i_w(t) = -i_v(t') = i_c \end{cases} \quad (19)$$

Current waveforms of Bridge-III are also plotted in FIGS. 15-16.

A description of example soft-switching operation and analysis under small inductive loads ($\phi[0, \pi/6]$) will now be provided.

Figure 15A:
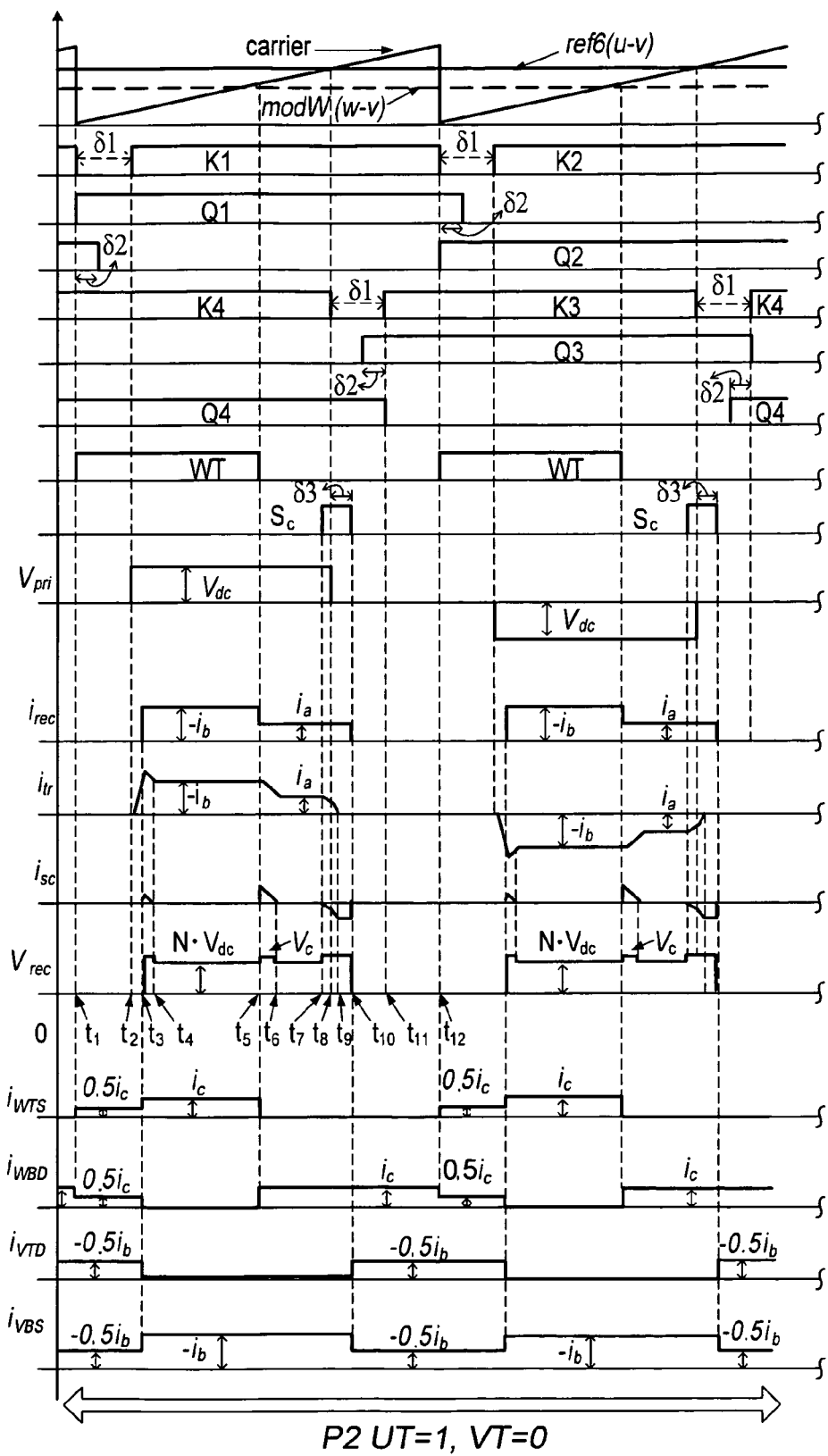
FIGS. 15A-15B show switching waveforms of a RHFL converter with small inductive loads using a ZVZCS scheme, where

Case 1 ($\omega t \in [\pi/6, \pi/3+\phi] \subset P2$, FIG. 15A: $i_{rec}$ switches from $-i_b$ to $i_a$ when WT turns off, and $-i_b > i_a > 0$. With their body diodes conduct, switches Q1-Q4 have no effect on operation. The converter has eleven operating modes within each half switching cycle as illustrated in FIG. 15A. The analysis starts at $t_1$ with zero $V_{rec}$, $i_{rec}$ and $i_{tr}$. Load currents $i_a$, $i_b$, and $i_c$ are circulating among three legs of Bridge III before $t_1$.

Mode 1 ($t_1$-$t_2$): Switch K2 turns off with zero-current at $t_1$; switches WT and WB of Bridge III commutate under ZVS. Both voltage $V_{pri}$ and $V_{rec}$ are zeros.

Mode 2 ($t_2$-$t_3$): K1 turns on at $t_2$. Because of the existence of leakage inductance, the transformer current $i_{tr}$ can only rise at a finite rate determined by $V_{dc}/(N \cdot L_k)$. Therefore, the turn-on loss of K1 is small although it is not strictly a zero-current switching.

Mode 3 ($t_3$-$t_4$): $i_{tr}$ reaches $-i_b$ at $t_3$. After that, the transformer leakage inductance resonates with the parasitic capacitance. $V_{rec}$ increases rapidly, then clamped to $V_c$. K1 and K4 conduct to transfer power to the secondary side. The stored energy in leakage inductance is recovered to the capacitor $C_c$. Currents of transformer and clamp capacitor are:

$$i_{tr}(t) = i_{tr}(t_3) - \frac{N \cdot V_{dc} - V_c}{N^2 \cdot L_k} \cdot t \quad (20)$$

$$i_{sc}(t) = i_{tr}(t) - (-i_b) \quad (21)$$

This mode ends when $i_{sc}$ decays to zero.

Mode 4 ($t_4$-$t_5$): The body diode of $S_c$ blocks, and $$V_{rec} = N \cdot V_{dc} \quad (22)$$

$$i_{tr}(t) = i_{rec}(t) = -i_b \quad (23)$$

Mode 5 ($t_5$-$t_6$): WT turns off and WB turns on at $t_5$. $i_{rec}$ changes from $-i_b$ to $i_a$. Diode of $S_c$ conducts. $i_{tr}$ and $i_{sc}$ change in a same way as given in equations (20) and (21). This mode ends when $i_{sc}$ decays to zero.

Mode 6 ($t_6$-$t_7$): The body diode of $S_c$ blocks.

$$V_{rec} = N \cdot V_{dc} \tag{24}$$

$$i_{tr}(t) = i_{rec}(t) = i_a \tag{25}$$

Mode 7 ($t_7$-$t_8$): At $t_7$, $S_c$ turns on under a small voltage. $i_{tr}$ decreases with a rate determined by equation (26).

$$i_{tr}(t) = i_a + \frac{N \cdot V_{dc} - V_c}{N^2 \cdot L_k} \cdot t \tag{26}$$

$$i_{sc}(t) = i_{tr}(t) - i_a \tag{27}$$

$$V_{rec} = V_c \tag{28}$$

$i_{rec}$ is now supplied by both transformer and capacitor $C_c$.

Mode 8 ($t_8$-$t_9$): At $t_8$, switch K4 turns off. Primary side voltage becomes zero, and $i_{tr}$ decays to zero rapidly with a rate determined by $V_c/L_k$.

Mode 9 ($t_9$-$t_{10}$): At $t_9$, $i_{tr}$ equals zero. The diodes on Bridge II turn off lossless. After $t_9$, $i_{rec}$ is only supplied by $C_c$.

Mode 10 ($t_{10}$-$t_{11}$): $S_c$ turns off at $t_{10}$. Parasitic capacitor discharges and $V_{rec}$ decay to zero so as $i_{rec}$. Load currents will circulate among Bridge III.

Mode 11 ($t_{11}$-$t_{12}$): $V_{rec}$, $i_{sc}$, $i_{tr}$ and $i_{rec}$ are all zeros. K3 turns on at ZCS at $t_{11}$. In order to ensure ZCS operation, the time $\delta 3$ (between the two falling edges of K4 and $S_c$) should satisfy:

$$\delta 3 > \frac{N^2 \cdot L_k \cdot i_{tr}(t_7)}{V_c} \tag{29}$$

Equation (30) should be satisfied for avoiding the short circuit of $C_c$.

$$\delta 1 > \delta 2 + \delta 3 \tag{30}$$

K1 turns off with ZCS at $t_{12}$. The next half cycle repeats with zero-voltage turn-on of WT.

According to the above analysis, switches K1 and K2 have ZCS off and ZCS on, while switches K3 and K4 have ZCS on. Switch $S_c$ turns on at ZVS. Currents of Q1-Q4 decay to zero before the associated switches begin to sustain reverse biased voltage (after $V_{rec}$ rises). Hence, diodes of Q1-Q4 have lossless turn-off, thereby eliminating reverse recovery problems.

Figure 15B:
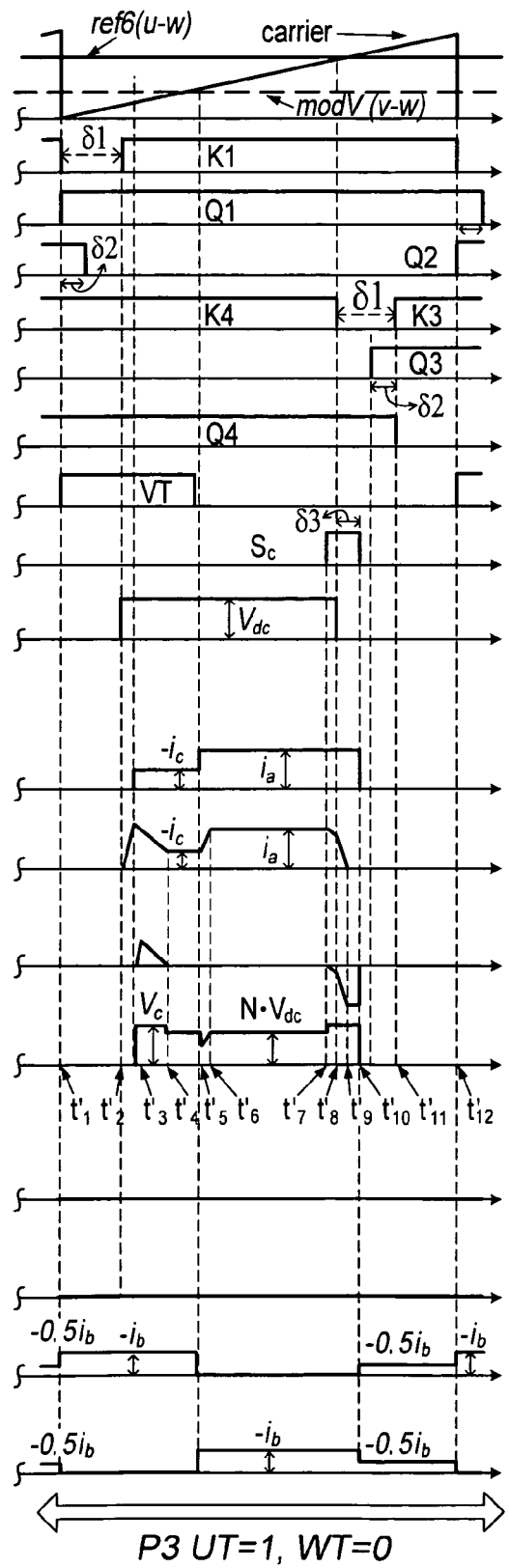

Case 2 ($\omega t' \in [\pi/2, \pi/3+\phi] \subset$ P3, FIG. 15B): In P3, u(t)−w(t) is the modulation references for Bridge I and II, while v(t)−w(t) is used to modulate switches on the leg V. Switches UT and WB remain on in P3. Consequently, $i_{rec}$ switches from $-i_c$ to $i_a$ whenever VT turns off. The eleven operating modes ($t'_1$-$t'_{12}$) at P3 are similar to the modes ($t_1$-$t_{12}$) at P2. The soft-switching scheme is also applicable. However, since $0 < -i_c < i_a$, the increasing on $i_{rec}$ may cause a narrow dent on $V_{rec}$ during the interval ($t'_5$-$t'_6$) as shown in FIG. 15B.

Case 3 ($\omega t \in [\pi/3+\phi, \pi/2] \subset$ P2): $0 < -i_b < i_a$, the operating modes are similar to Case 2 and the soft-switching of Bridge II summarized in Case 1 is valid as well.

Case 4 ($\omega t' \in [2\pi/3+\phi, 5\pi/6] \subset$ P3): $-i_c > i_a > 0$, the operating modes are similar to Case 1, as is the soft-switching.

Therefore, when $\phi \in [0, \pi/6]$, no switching loss appear on Bridge I and II except the hard-turn-off on switches K3 and K4. The turn-off loss of a MOSFET during one switching cycle can be calculated using the widely accepted estimation equation (31):

$$\Delta E_{off\_K}(t) = \left(\frac{1}{2} \cdot V_{dc} \cdot t_{off}\right) \cdot i_k(t) \times 2 \tag{31}$$

where $i_k$ is the drain-source current before a MOSFET turns off and $V_{dc}$ is the voltage after; $t_{off}$ is the turn-off time. Multiplexing by 2 is because of two times of turn-off within one switching period ($f_s$ Hz). If other conditions are the same, $t_{off}$ is lesser than $T_{off\_M}$, the maximal turn-off time with the rated continuous current. Thus, equation (31) can be rewritten as:

$$\Delta E_{off\_K}(t) \leq \left(\frac{1}{2} \cdot V_{dc} \cdot T_{off\_M}\right) \cdot i_k(t) \times 2 = 2 \cdot E_{off\_K} \cdot i_k(t) \tag{32}$$

Next, operation and analysis of soft-switching under large inductive loads ($\phi \in [\pi/6, \pi/2]$) are considered.

Figure 16A:
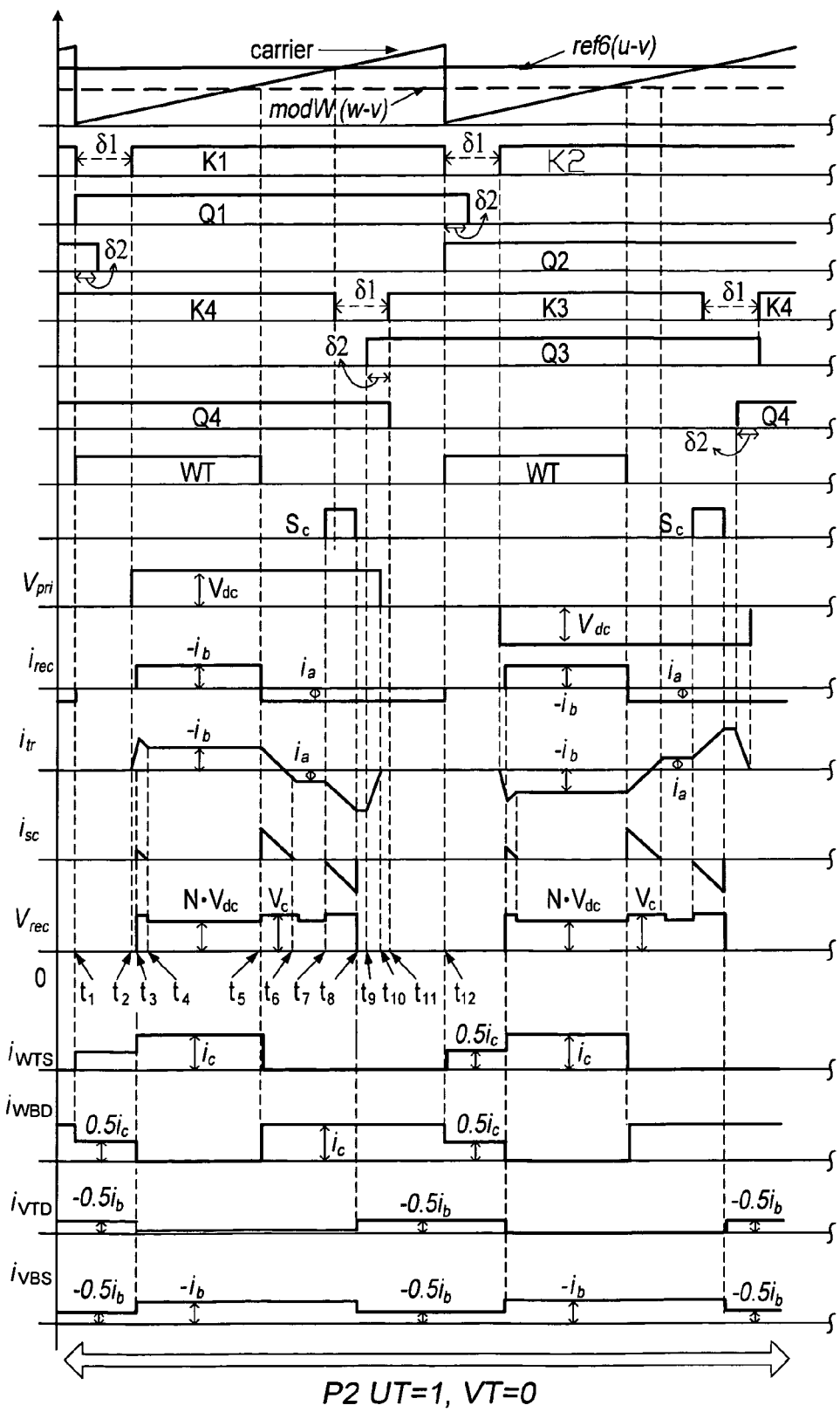
FIGS. 16A-16B show switching waveforms of a RHFL converter with large inductive loads using a ZVZCS scheme, where
Figure 16B:
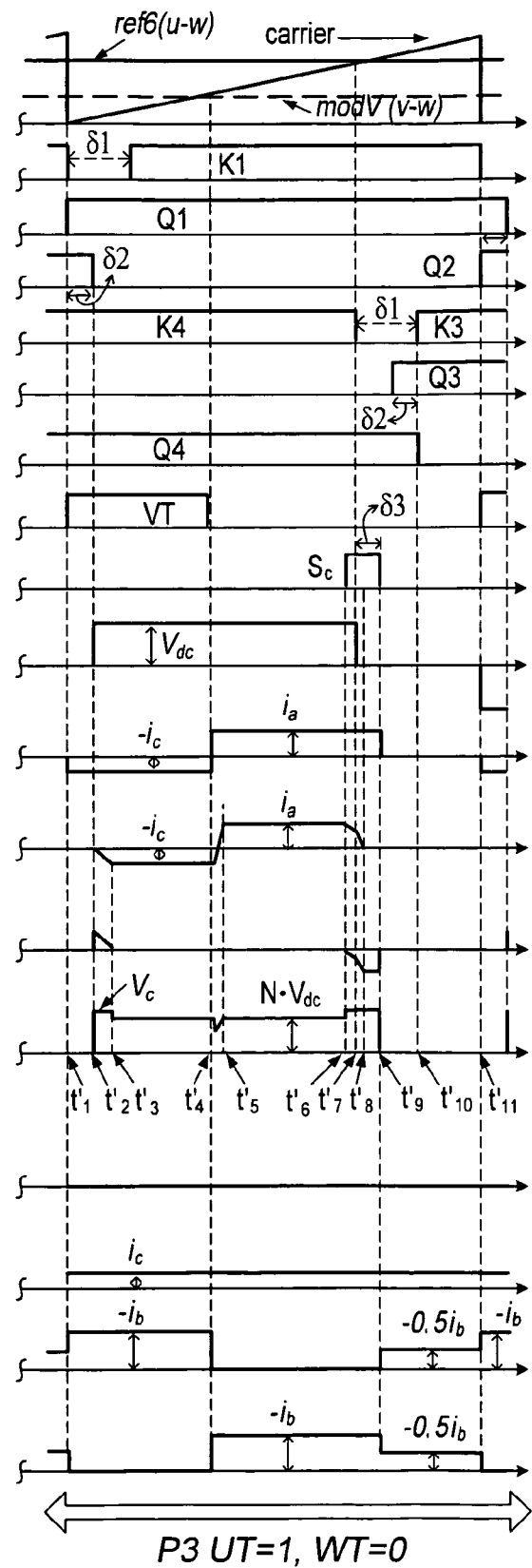

Case 5 ($\omega t \in [\pi/6, \pi/6+\phi] \subset$ P2, FIG. 16A): $i_{rec}$ is not always larger than zero in this case since $-i_b > 0$ but $i_a < 0$. The converter has eleven operating modes as illustrated in FIG. 16A. $i_{rec}$ equals $i_a$ before $t_1$. It is freewheeling through switches Q2 and Q4. $i_{tr} = 0$, $V_{rec} = 0$, and $V_{pri} = 0$.

Mode 1 ($t_1$-$t_2$): Switch K2 turns off under zero-current; Q1 turns on under zero-voltage at $t_1$. Switches WT and WB commutate under zero-voltage, which cause $i_{rec}$ change from $i_a$ to zero. Q2 turns off under zero-voltage. Voltage $V_{pri}$, $V_{rec}$ and $i_{tr}$ remain at zero until the turn-on of K1.

Mode 2 ($t_2$-$t_3$) to Mode 6 ($t_6$-$t_7$) resemble the corresponding five modes under the same numbers in Case 1. K1 turns on with ZCS at $t_2$ due to the transformer leakage inductance. After $t_6$, $i_{tr}$ is less than zero, current flowing in Bridge II shifts from body diodes of Q1-Q4 to their IGBTs, and diodes in Bridge I conducts current.

Mode 7 ($t_7$-$t_8$): $S_c$ turns on under near zero-voltage condition. The transformer current increases as:

$$i_{tr}(t) = i_a + i_{sc}(t) = i_a + \frac{V_c - N \cdot V_{dc}}{N^2 \cdot L_k} \cdot t \tag{33}$$

Mode 8 ($t_8$-$t_9$): $S_c$ turns off at $t_8$, which shuts down $i_{sc}$. The parasitic capacitance on the secondary side discharges to maintain the transformer current $i_{tr}$. $V_{rec}$ drops rapidly. K4 turns off lossless before $t_8$ since its body diode conducts.

Mode 9 ($t_9$-$t_{10}$): Switch Q3 turns on under zero-voltage at $t_9$, and $i_{rec}$ starts free-wheeling through Q1 and Q3. The leakage current $i_{tr}$ reduces rapidly and the stored energy releases to the primary side.

Mode 10 ($t_{10}$-$t_{11}$): $i_{tr}$ equals zero after $t_{10}$. Diodes on the primary side turn off softly and therefore $V_{pri}$ drops to zero. $i_{rec}$, however, continues to flow through Q1 and Q3.

Mode 11 ($t_{11}$-$t_{12}$): $V_{rec}$, $i_{sc}$, $i_{tr}$ and $V_{pri}$ are all zeros. At $t_{11}$, Q4 turns off under ZVS (or ZCS) and K3 turns on under ZCS. At $t_{12}$, K1 turns off under ZCS and Q2 turns on under ZVS (or ZCS). The next half cycle repeats with ZVS-turn-on of WT.

Therefore, switches Q1 to Q4 have ZVS on and off, while switches K1-K4 have ZCS on and ZCS off. Diodes for all front-end switches have no switching losses. In other words, no switching loss occurs on Bridge I and II for this case.

Case 6 ($\omega t' \in [\pi/2, \pi/3+\phi,] \subset$ P3, FIG. 16B): Before $t'_1$, $i_{rec} = 0$, $i_{tr} = 0$, $V_{rec} = 0$, and $V_{pri} = 0$.

Mode 1 (t'$_1$-t'$_2$): Switch Q1 turns on at t'$_1$ with ZVS; switches VT and VB commutate under the zero-voltage. The resultant i$_{rec}$ changes from zero into –i$_c$. This current is freewheeling through switches Q2 and Q4. Voltage V$_{pri}$ and V$_{rec}$ are still zeros. i$_{tr}$ remains at zero as well.

Mode 2(t'$_2$-t'$_3$): Q2 turns off at t'$_2$. i$_{rec}$ starts flow through transformer and Q1, Q4. Again, the transformer current i$_{tr}$ can only rise at a finite rate. The parasitic capacitor and C$_c$ will conduct the difference between i$_{rec}$ and i$_{tr}$. V$_{rec}$ will be clamped to V$_c$ rapidly. This mode ends at t$_3$ when i$_{tr}$ reaches –i$_c$ after that the body diode of S$_c$ blocks.

Mode 3 (t'$_3$-t'$_4$): In this interval, i$_{tr}$ equals –i$_c$, and V$_{rec}$ equals N·V$_{dc}$. The power is flowing back to the input side. K1 turns on at ZCS since its body diode conducts.

Mode 4 (t'$_4$-t'$_5$): VT turns off and VB turns on at t'$_4$. i$_{rec}$ changes from a negative value –i$_c$ into a positive value i$_a$. Currents flowing through Q1, Q4 shift from IGBTs to their anti-parallel diodes. Currents in K1 and K4 change from their body diodes to the MOSFET channels. Similar to the operations in interval (t'$_5$-t'$_6$) of FIG. 15B, a narrow dent on V$_{rec}$ may occur.

Mode 5 (t'$_5$-t'$_6$) to Mode 10 (t'$_{10}$-t'$_{11}$) resemble the operations between (t'$_6$-t'$_{12}$) of Case 2 in FIG. 15B, and the soft-switching during these intervals is the same.

Notice that Q3 turns on with ZVS between (t'$_9$-t'$_{10}$) and Q4 turns off with ZVS at t'$_{10}$. One can conclude that both Q1 and Q2 have ZVS on, while both Q3 and Q4 have ZVS on and ZVS off. As for Bridge I, K3, K4 have ZCS on, while both K1 and K2 have ZCS on and ZCS off. Switching losses in this case include turn-off losses of Q1, Q2, K3 and K4.

Equation (32) is still applicable for estimating the turn-off loss of K3 and K4. As for Q1 and Q2, their losses can be calculated based on the assumption that switching energy is proportional to the current:

$$\Delta E_{off\_Q}(t) = 2 \cdot E_{off\_s} \cdot i_w(t) \quad (34)$$

E$_{off\_s}$ in equation (34) is the per ampere turn-off energy for an IGBT. Following the same way, the per ampere turn-on energy for an IGBT, and turn-on and turn-off energy for a diode can be denoted accordingly.

Case 7 (ωt ∈[(φ, π/2] ⊂ P2): Since –i$_b$>i$_a$>0, the operating modes and soft-switching scheme are similar to Case 1.

Case 8 (ωt' ∈[π/3+φ, 5π/6] ⊂ P3): Since 0<–i$_c$<i$_a$, the operating modes and soft-switching scheme are similar to Case 2.

An analysis and comparison of switching loss can now be provided. Switching losses of front-end Bridges I and II are analyzed first. By integrating equation (32) over P2 and P3, the switching losses on the two ranges can be calculated respectively as:

$$P_{front\_P2} < \frac{3f_s}{\pi} \cdot \int_{\frac{\pi}{6}}^{\frac{\pi}{2}} [2E_{off\_K} \cdot N \cdot i_w(t)] \cdot dt \quad (35)$$

$$P_{front\_P3} < \frac{3f_s}{\pi} \cdot \int_{\frac{\pi}{2}}^{\frac{3\pi}{5}} [2E_{off\_K} \cdot N \cdot i_w(t)] \cdot dt \quad (36)$$

The switching losses of Bridge I and II for φ ∈[0, π/6]) are obtained by averaging equations (35) and (36):

$$P_{front} = \frac{1}{2} \cdot \left( \begin{array}{c} P_{front\_P2} + \\ P_{front\_P3} \end{array} \right) < \frac{3f_s}{\pi} \cdot I \cdot E_{off\_K} \cdot N \cdot \left[ \begin{array}{c} \cos(\frac{\pi}{6}+\varphi) + \\ \cos(\frac{\pi}{6}-\varphi) \end{array} \right] \quad (37)$$

Similarly, switching losses of Bridges I and II for φ∈[π/6, π/2]) is calculated as:

$$P_{front} < \frac{3f_s \cdot I}{\pi} \cdot \left\{ \begin{array}{c} E_{off\_K} \cdot N \cdot [1+\cos(\frac{\pi}{6}+\varphi)] + \\ E_{off\_s} \cdot [1-\cos(\frac{\pi}{6}-\varphi)] \end{array} \right\} \quad (38)$$

Finally, the switching losses of Bridge III are analyzed. Following the operating principle of the hybrid modulation described above, the switching losses of Bridge III can be described by the following equations:

$$P_{III} = \frac{3f_s}{\pi} \cdot I \cdot \left\{ \begin{array}{c} E_D \cdot \left[ \begin{array}{c} \cos(\frac{\pi}{6}+\varphi) + \\ \cos(\frac{\pi}{6}-\varphi) \end{array} \right] + \\ \left(\frac{3}{2}E_D + E_S\right) \cdot \left[ \begin{array}{c} 2-\cos(\frac{\pi}{6}+\varphi) - \\ \cos(\frac{\pi}{6}-\varphi) \end{array} \right] \end{array} \right\} \quad (39)$$

for small inductive loads (φ ∈[0, π/6]) and $$P_{III} = \frac{3f_s}{\pi} \cdot I \cdot \left\{ \begin{array}{c} E_D \cdot [1+\cos(\frac{\pi}{6}+\varphi)] + \\ \left(\frac{3}{2}E_D + E_S\right) \cdot \left[ \begin{array}{c} \cos(\frac{\pi}{6}-\varphi) - \\ \cos(\frac{\pi}{6}+\varphi) \end{array} \right] \end{array} \right\} \quad (40)$$

for large inductive loads (φ ∈[π/6, π/2]. In equations (39) and (40), E$_D$=E$_{on\_D}$+E$_{off\_D}$, E$_S$=E$_{on\_S}$+E$_{off\_S}$.

Example embodiments of the present invention have been shown and described herein, having various features and advantages. Example inverters employing hybrid modulation allow removal of the dc-link filter evident in conventional inverters, where the diode rectifier stage is followed by a low-pass filter and a voltage-source inverter (VSI). Significant reduction in switching loss of the ac/ac converter switches, and hence an overall ac/ac converter or overall inverter (if the ac/ac converter is an integral part) is provided by modulating the switches of 2 of the 3 legs of a 6-switch ac/ac converter at a low frequency (e.g., 120/100 Hz) while modulating the third leg at high switching frequency. Yet, at the output of the AC/AC converter or the overall inverter (if the AC/AC converter is an integral part), a three-phase sinusoidal modulated waveform is still obtained using an all-forced switching VSI. Unlike the VSI approach, an example direct-power-conversion (DPC) inverter according to embodiments of the present invention allows the retention of the sine-wave modulated switching information at the output of the diode rectifier rather than filtering it. Thus, for high power applications, example embodiments of the present invention provide tangible improvement in footprint space and system reliability due to intermediate bulky filter elimination and higher energy conversion efficiency without compromising quality of voltage output as compared to a conventional VSI approach.

Variations on the example embodiments are possible, and such variations are to be considered part of the present invention. As one such nonlimiting example, the converters or inverters can be multilevel and scalable for higher power. As another example, the input frequency of the AC/AC converter pulsating DC can be different from the forced switching frequency of the AC/AC converter.

Additionally, example soft-switching schemes have been provided for the front-end of a rectifier-type high-frequency-link (RHFL) three-phase pulse-width-modulated (PWM) converter. This soft-switching scheme achieves zero-current switching (ZCS) for the primary side full-bridge, as well as zero-voltage switching (ZVS) for the secondary-side full-bridge rectifier. The body diodes on both the bridges turn-off softly and no reverse-recovery problem arises. Example ZVZCS schemes can reduce the overall switching loss of the RHFL converter by shifting switching actions from slow devices on the high-voltage side to relatively faster ones on the low-voltage side. Therefore, such methods and systems are suitable for low-voltage dc to high-voltage ac conversion. Example soft-switching schemes are valid for various load conditions with bi-directional power flow.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. An ac/ac converter for accepting a pulsating dc input with encoded sinusoidal modulation and providing a multiphase modulated output, the converter comprising:
   a bridge comprising a plurality of switches having switch legs for modulating the pulsating dc input at a carrier frequency over a plurality of phases, said bridge being coupled at one end to a pulsating dc source and coupled at another end to a modulated signal output;
   a controller for the plurality of switches for causing, for each of the plurality of phases, under unity power factor, one of the switch legs to modulate the pulsating dc input at the carrier frequency while the other switch legs do not modulate the pulsating dc input at the carrier frequency.

2. The ac/ac converter of claim 1, wherein, when said driver is causing the one of the switch legs to modulate the pulsating dc input at the carrier frequency, said driver causes the other switch legs to not switch.

3. The ac/ac converter of claim 1, wherein each of the switch legs does not modulate the pulsating dc input at a point when a phase current being supplied to the switch leg is at a maximum value.

4. The ac/ac converter of claim 1, wherein said bridge comprises a plurality of upper and lower switches having legs drive-coupled to said controller.

5. The ac/ac converter of claim 1, wherein the plurality of switches comprises upper and lower sets of switches in each switch leg;
   wherein the plurality of phases comprises three phases; and
   wherein for each of the upper and lower sets, during a particular phase, one of the switch legs is controlled to switch to modulate the pulsating dc input at the carrier frequency while the other two legs are not controlled to switch.

6. The ac/ac converter of claim 1, wherein said controller is configured to provide the plurality of switch legs with respective modulating references.

7. The ac/ac converter of claim 6, wherein said controller comprises:
   a source of a plurality of modulation reference signals, wherein at least one modulation signal is provided for each of the switch legs;
   a comparator for comparing the plurality of modulation reference signals to a carrier and providing a comparator output;
   wherein the comparator output controls the switch legs.

8. An inverter comprising:
   a front-end high frequency dc/dc converter stage coupled to a power source; and
   an ac/ac converter coupled to said front-end high frequency dc/dc converter stage;
   wherein said ac/ac converter comprises a bridge including a plurality of switches having switch legs for modulating an input signal from said front-end high frequency dc/dc converter stage at a carrier frequency over a plurality of phases, said bridge being coupled at one end to said front-end high frequency dc/dc converter stage and coupled at another end to a modulated signal output, and a controller for the plurality of switches for causing, for each of the plurality of phases, under unity power factor, one of the switch legs to modulate the input signal at the carrier frequency while the other switch legs do not modulate the input signal at the carrier frequency.

9. The inverter of claim 8 wherein said front-end high frequency dc/dc converter stage comprises:
   a dc/ac inverter coupled to said power source;
   a high frequency transformer coupled to an output of said dc/ac inverter; and
   a diode rectifier coupled to an output of said high frequency transformer.

10. The inverter of claim 9, wherein said ac/ac converter is coupled to said diode rectifier without a decoupling link capacitor.

11. The inverter of claim 10, wherein said dc/ac inverter is operated with sine-wave modulation.

12. The inverter of claim 9, wherein said front-end high frequency dc/dc converter stage comprises:
   a dc/ac inverter coupled to said power source;
   a transformer coupled to an output of said dc/ac inverter;
   a diode rectifier coupled to an output of said transformer; and
   a link capacitor coupled to an output of said diode rectifier.

13. A power electronics system comprising a plurality of connected inverters according to claim 8.

14. The power electronics system of claim 13, wherein said plurality of connected inverters include inputs connected in parallel and outputs connected in series.

15. A soft-switching device comprising:
   first and second front-end single-phase bridges;
   a high-frequency transformer coupled to said first and second front-end single-phase bridges;
   an ac/ac converter coupled to an output of said high-frequency transformer;
   wherein said ac/ac converter comprises:
   a bridge comprising a plurality of switches having switch legs for modulating the transformer output at a carrier frequency over a plurality of phases, said bridge being coupled at one end to said transformer and coupled at another end to a modulated signal output;

a controller for the plurality of switches for causing, for each of the plurality of phases, under unity power factor, one of the switch legs to modulate the pulsating dc input at the carrier frequency while the other switch legs do not modulate the pulsating dc input at the carrier frequency.

16. The soft-switching device of claim 15, wherein said front-end is configured to achieve zero-current switching.

17. An ac/ac converter for accepting a pulsating dc input with encoded sinusoidal modulation and providing a multiphase modulated output, the converter comprising:

means for modulating the pulsating dc input at a carrier frequency over a plurality of phases, said means for modulating comprising a plurality of switches having switch legs;

means for controlling said means for modulating such that, for each of the plurality of phases, under unity power factor, one of the switch legs modulates the pulsating dc input at the carrier frequency while the other switch legs do not modulate the pulsating dc input at the carrier frequency.

18. The converter of claim 17, wherein said means for controlling comprises:

means for providing a plurality of reference modulation signals;

means for processing the provided plurality of reference modulation signals to drive said means for modulating.

19. A method for providing a multiphase modulated output from a pulsating dc input with encoded sinusoidal modulation, the method comprising:

receiving the pulsating dc input by a plurality of switches having switch legs for modulating the pulsating dc input at a carrier frequency over a plurality of phases;

controlling the plurality of switches to cause, for each of the plurality of phases, under unity power factor, one of the switch legs to modulate the pulsating dc input at the carrier frequency while the other switch legs do not modulate the pulsating dc input at the carrier frequency.

* * * * *

UNITED STATES PATENT AND TRADEMARK OFFICE
CERTIFICATE OF CORRECTION

| | | |
|---|---|---|
| PATENT NO. | : 7,768,800 B2 | Page 1 of 1 |
| APPLICATION NO. | : 12/334273 | |
| DATED | : August 3, 2010 | |
| INVENTOR(S) | : Mazumder et al. | |

It is certified that error appears in the above-identified patent and that said Letters Patent is hereby corrected as shown below:

<u>On the Title Page</u>:
Insert --Foreign Patent Documents, WO-2007/050577, 5/2007, WIPO--.

Col. 14, line 35
Delete "v(t) - w(t)  P4:  $5\pi/6 \leq \omega t < 3\pi/2$" and insert --v(t) - w(t)  P4:  $5\pi/6 \leq \omega t < 7\pi/6$-- therefor.

Col. 17, line 52
Delete "$(\omega t' \in [\pi/2, \pi/3+\varphi])$" and insert --$(\omega t' \in [\pi/2, 2\pi/3+\varphi])$-- therefor.

Col. 18, line 66
Delete "$(\omega t' \in ([\pi/2, \pi/3+\varphi,] \subset P3$" and insert --$(\omega t' \in [\pi/2, \pi/3+\varphi,] \subset P3$-- therefor.

Col. 19, line 46
Delete "$(\omega t \in [(\varphi, \pi/2] \subset P2)$" and insert --$(\omega t \in [\varphi, \pi/2] \subset P2)$-- therefor.

Signed and Sealed this
Twenty-eighth Day of December, 2010

David J. Kappos
*Director of the United States Patent and Trademark Office*